US012183530B2

(12) United States Patent
Lu et al.

(10) Patent No.: US 12,183,530 B2
(45) Date of Patent: Dec. 31, 2024

(54) CIRCUIT BREAKER

(71) Applicant: ZHEJIANG CHINT ELECTRICS CO., LTD., Zhejiang (CN)

(72) Inventors: Kejun Lu, Zhejiang (CN); An Yang, Zhejiang (CN)

(73) Assignee: ZHEJIANG CHINT ELECTRICS CO., LTD. (CN)

( * ) Notice: Subject to any disclaimer, the term of this patent is extended or adjusted under 35 U.S.C. 154(b) by 132 days.

(21) Appl. No.: 17/918,501

(22) PCT Filed: Dec. 25, 2020

(86) PCT No.: PCT/CN2020/139369
§ 371 (c)(1),
(2) Date: Oct. 12, 2022

(87) PCT Pub. No.: WO2021/208488
PCT Pub. Date: Oct. 21, 2021

(65) Prior Publication Data

US 2023/0145051 A1 May 11, 2023

(30) Foreign Application Priority Data

Apr. 13, 2020 (CN) ......................... 202010284872.0

(51) Int. Cl.
*H01H 9/20* (2006.01)
*H01H 71/02* (2006.01)
(Continued)

(52) U.S. Cl.
CPC .............. *H01H 71/58* (2013.01); *H01H 9/20* (2013.01); *H01H 71/0207* (2013.01); *H01H 71/04* (2013.01)

(58) Field of Classification Search
CPC ...... H01H 71/58; H01H 9/20; H01H 71/0207; H01H 71/04; H01H 2071/046; H01H 9/24;
(Continued)

(56) References Cited

U.S. PATENT DOCUMENTS 5,478,979 A * 12/1995 Castonguay ............. H01H 9/26 200/400
7,864,005 B2 1/2011 Gouhl et al. .................... 335/18

FOREIGN PATENT DOCUMENTS

CN 109585233 A 4/2019
CN 109686625 A 4/2019
(Continued)

OTHER PUBLICATIONS

International Search Report mailed Mar. 29, 2021 in corresponding PCT International Application No. PCT/CN2020/139369.
(Continued)

*Primary Examiner* — Ahmed M Saeed
(74) *Attorney, Agent, or Firm* — OSTROLENK FABER LLP

(57) ABSTRACT

A circuit breaker with a circuit breaker housing that includes a switch-on button hole and a switch-off button hole, a button mechanism that includes a switch-on button and a switch-off button, the switch-on button including a switch-on button operating end slidably arranged in the said switch-on button hole, the switch-off button including a switch-off button operating end slidably arranged in the switch-off button hole. While the switch-on button operating end is being pressed toward the inside of the circuit breaker housing to enable the circuit breaker to switch on, the switch-off button operating end moves toward the outside of the circuit breaker housing, and while the switch-off button operating end is being pressed toward the inside of the circuit breaker housing to enable the circuit breaker to
(Continued)

switch off, the switch-on button operating end moves toward the outside of the circuit breaker housing.

14 Claims, 10 Drawing Sheets

(51) Int. Cl.
*H01H 71/04* (2006.01)
*H01H 71/58* (2006.01)

(58) Field of Classification Search
CPC .......... H01H 13/68; H01H 73/08; H01H 9/22; H01H 71/10; H02B 1/0565; H02B 11/133; H02B 11/167; H02B 11/28; H02B 11/173
See application file for complete search history.

(56) References Cited

FOREIGN PATENT DOCUMENTS

| | | | |
|---|---|---|---|
| CN | 109686626 | A | 4/2019 |
| CN | 109698099 | A | 4/2019 |
| CN | 209388985 | U | 9/2019 |
| CN | 209708923 | U | 11/2019 |
| CN | 111477508 | A | 7/2020 |
| DE | 3213493 | A1 | 10/1983 |
| GB | 1079012 | A | 8/1967 |

OTHER PUBLICATIONS

Extended European Search Report, dated Mar. 12, 2024, issued in corresponding European Patent Application No. EP20931092.

* cited by examiner

CIRCUIT BREAKER

CROSS-REFERENCE TO RELATED APPLICATIONS

The present application is a 35 U.S.C. §§ 371 national stage application of International Application No. PCT/CN2020/139369, filed Dec. 25, 2020, which claims priority to Chinese Patent Application No. CN202010284872.0, filed Apr. 13, 2020, the contents of both of which are incorporated herein by reference.

FIELD OF THE INVENTION

The present invention relates to the field of low-voltage appliance, in particular to a circuit breaker.

BACKGROUND OF THE INVENTION

Circuit breakers have been widely used with effective improvement for safely using appliances, accordingly, also shall continuously upgrade and improve in their overall structure and operation mode, adapting themselves to the development trend in the miniaturization of appliances. After full investigation and research on the prior arts, we have found that the existing circuit breakers have the following deficiencies.

1. A switch-off and switch-on indicating structure is mostly applied in an existing plug-in circuit breaker to indicate a switch between the switch-off and switch-on states of the circuit breaker, giving rise to the problems of complex internal structure and larger overall volume of circuit breaker. Moreover, an operating mechanism mostly has its buttons protruding outside the circuit breaker housing, and hence easily causing the misoperation to the circuit breaker due to accidental touch, so it affects the stability and safety of electricity consumption.

2. An existing plug-in circuit breaker generally has two locking mechanisms, in which one is to prevent the circuit breaker from switching on without reaching the designated position, and the other is to prevent the circuit breaker from being inserted into or pulled out of a cabinet in a switch-on state, and which both have a structure that is complex and takes up a lot of internal space of the circuit breaker.

3. Pulling out an existing plug-in circuit breaker from an assembling position of the circuit breaker is generally achieved by pulling of the button of the existing plug-in circuit breaker; when user pulls the button for switch-off operation, they often directly pull the circuit breaker out of its assembling position due to their inability to accurately control operating force, so it affects the stability and safety of the users' electricity consumption.

4. An existing plug-in circuit breaker has an unreasonable design for its housing, such as a scattering of the openings arranged on the housing, so it is not easy to install the circuit breaker.

SUMMARY OF THE INVENTION

The present invention aims to overcome the defects of the prior art, providing a circuit breaker, which includes a switch-on button and a switch-off button corresponding to a switch-on operation and a switch-on operation, respectively, so as to enable the switch-on and switch-off states of the circuit breaker to be judged by observing the states of the two buttons, and a switch-on button operating end and a switch-off button operating end are arranged in a switch-on button hole and a switch-off button hole, respectively, so as to enable the circuit breaker to avoid misoperation due to accidental touch.

In order to achieve the above object, the technical scheme adopted in the present invention is as follows:

A circuit breaker, comprising a circuit breaker housing 1, and a button mechanism 2 and an operating mechanism connected with said button mechanism 2, which are arranged inside the circuit breaker housing respectively; the circuit breaker housing 1 includes a switch-on button hole 110 and a switch-off button hole 111 all arranged thereon, the button mechanism 2 includes a switch-on button 20 and a switch-off button 21 slidably arranged inside the circuit breaker housing 1, respectively, the switch-on button 20 includes a switch-on button operating end arranged at one end thereof and slidably arranged in the switch-on button hole 110, the switch-off button 21 includes a switch-off button operating end arranged at one end thereof and slidably arranged in the switch-off button hole 111;

while the switch-on button operating end is being pressed toward the inside of the circuit breaker housing 1 to drive said operating mechanism to enable the circuit breaker to switch on, the switch-off button operating end moves toward the outside of the circuit breaker housing 1, while the switch-off button operating end is being pressed toward the inside of the circuit breaker housing 1 to drive said operating mechanism to enable the circuit breaker to switch off, the switch-on button operating end moves toward the outside of the circuit breaker housing 1.

Preferably, the operating mechanism includes a bar linkage, and a transmission member 4 and a lever mechanism all pivotally arranged inside the circuit breaker housing 1, the bar linkage includes a switch-on connecting rod 30, a switch-off connecting rod 31 and a transmission connecting rod 32; the reverse end of the switch-on button 20 is drivingly connected to the transmission member 4 through the switch-on connecting rod 30, the reverse end of the switch-off button 21 is drivingly connected to the transmission member 4 through the switch-off connecting rod 31, the transmission member 4 is drivingly connected with the lever mechanism through the transmission connecting rod 32, and the lever mechanism is connected with a movable contact 60 of the circuit breaker; when the switch-on button 20 is pressed toward the inside of the circuit breaker housing 1 to enable the circuit breaker to switch on, the switch-on button 20 actuates the transmission member 4 to rotate in a first direction through the switch-on connecting rod 30, meanwhile, the rotation of the transmission member 4 drives the switch-off button 21 to move toward the outside of the circuit breaker housing 1 through the switch-off connecting rod 31; when the switch-off button 21 is pressed toward the inside of the circuit breaker housing 1 to enable the circuit breaker to switch off, the switch-off button 21 actuates the transmission member 4 to rotate in a second direction through the switch-off connecting rod 31, meanwhile, the rotation of the transmission member 4 drives the switch-on button 20 to move toward the outside of the circuit breaker housing 1 through the switch-on connecting rod 30, the first direction and the second direction are opposite to each other.

Preferably, the transmission member 4 includes a transmission member axle hole 400, a first connection hole 40, a second connection hole 41 and a third connection hole 42, the first connection hole 41, the second connection hole 41 and the third connection hole 42 are positioned at three vertices of a triangle, respectively, and the transmission member axle hole 400 is arranged in the middle of the transmission member 4; the transmission member 4 is pivotally arranged on the circuit breaker housing 1 through its transmission member axle hole 400, and the transmission member 4 is connected to the switch-on connecting rod 30, the switch-off connecting rod 31 and the transmission connecting rod 32 by means of the first connection hole 40, and the second connection hole 41 and the third connection hole 42, respectively;

the lever mechanism includes a jump buckle 50, a lock catch 51 and a rotating plate 52 pivotally arranged on the circuit breaker housing 1, the jumper buckle 50 and the lock catch 51 are locked with each other and pivotally arranged on the rotating plate 52, respectively, the rotating plate 52 is connected with the movable contact 60 of the circuit breaker, and the transmission member 4 is drivingly connected with the jumper buckle 50 through the transmission connecting rod 32.

Preferably, the circuit breaker includes a first track mechanism and a second track mechanism used to respectively define the movement paths of the switch-on button 20 and the switch-off button 21.

Preferably, the first track mechanism includes a switch-on button track protrusion 201 arranged on the switch-on button 20 and a switch-on button track groove 101 arranged on the circuit breaker housing 1, the switch-on button track protrusion 201 is slidably arranged in the switch-on button track groove 101; the second track mechanism includes a switch-off button track groove arranged on the circuit breaker housing 1, and the switch-off button 21 is slidably arranged in the switch-off button track groove.

Preferably, the first track mechanism includes a switch-on button track protrusion 201 arranged on the switch-on 20 and a switch-on button track groove 101 arranged on the circuit breaker housing 1, and the switch-on button track protrusion 201 is slidably arranged in the switch-on button track groove 101; the second track mechanism includes a switch-off button track bar 205 arranged on the switch-on button 20 and in the length direction of the switch-on button 20 and a switch-off button track groove 2150 arranged on the switch-off button 21, and the switch-off button track groove 2150 is slidably co-operated with the switch-off button track bar 205.

Preferably, the circuit breaker further includes a locking mechanism co-operated with the button mechanism 2, the locking mechanism includes a first locking member 1*a* with one end protruding outside the circuit breaker housing 1, said circuit breaker housing 1 includes a locking member opening 17 co-operated with the first locking member 1*a;* when the circuit breaker is in the switch-off state, one end of the first locking member La extends outside the circuit breaker housing 1 from the locking member opening 17, the first locking member 1*a* can retract into the inside of the circuit breaker housing 1 under the function of an external force for retraction;

when the circuit breaker is in the switch-on state, the first locking member 1*a* protrudes outside the circuit breaker housing 1, and the first locking member 1*a* can not retract into the inside of the circuit breaker housing 1 because of the limitation by the switch-on button 20 and/or the switch-off button 21.

Preferably, the circuit breaker further includes an unlocking mechanism drivingly connected to the first locking member 1*a;* when the circuit breaker is in the switch-off state, operating the unlocking mechanism enables the first locking member 1*a* to retract into the inside of the circuit breaker housing 1.

Preferably, after retracting into the inside of the circuit breaker housing 1 the first locking member 1*a* is co-operated with the switch, on button 20 and/or the switch-off button 21 in a position-limit way, and the switch-on button 20 and/or the switch-off button 21 enables the circuit breaker not to switch on;

the switch-on button 20 and/or the switch-off button 21 is provided with a button limiting groove 216 co-operated with the first locking member 1*a* in a position-limit way, and the first locking member 1*a* includes a first locking member limiting protrusion 14*a* fitted with the button limiting groove 216 in a position-limit way;

when the circuit breaker is in the switch-on state, the button limiting groove 216 is misaligned with the first locking member limiting protrusion 14*a*, and the switch-on button 20 and/or the switch-off button 21 prevent the first locking member 1*a* from moving toward the inside of the circuit breaker housing 1; when the circuit breaker is in the switch-off state, the button limiting groove 216 is arranged opposite to the first locking member limiting protrusion 14*a*, so the first locking member 1*a* can move toward the inside of the circuit breaker housing 1 under an external force of retraction, enabling the first locking member limiting protrusion 14*a* to slide into the button limiting groove 216 and lock the switch-on button 20 and/or the switch-off button 21.

Preferably, the switch-on button 20 and the switch-off button 21 are parallelly arranged and slidably and linearly installed inside the circuit breaker housing 1, the first locking member 1*a* is movably and linearly installed inside a housing 6, and the movement directions of the switch-on button 20 and the switch-off button 21 are perpendicular to the movement direction of the first locking member 1*a;* the locking mechanism further includes a first resetting spring 5*a* arranged between the circuit breaker housing 1 and the first locking member 1*a*, and the first resetting spring 5*a* applies a force on the first locking member 1*a*, so as to enable one end of the first locking member 1*a* to protrude outside the circuit breaker housing 1.

Preferably, the switch-on button 20 and the first locking member 1*a* are both positioned between the switch-off button 21 and the locking member opening 17, and the first locking member 1*a* is positioned at one side of the switch-on button 20; the switch-off button 21 includes a button limiting groove 216 co-operated with the first locking member 1*a* at a limited position, the first locking member 1*a* includes a first locking member limiting protrusion 14*a* fitted with the button limiting groove 216, and the switch-on button 20 is provided with a switch-on button avoiding groove 206 used to leave off the first locking member limiting protrusion 14*a* of the first locking member 1*a;* when one end of the first locking member 1*a* protrudes outside the circuit breaker housing 1, the first locking member limiting protrusion 14*a* is positioned in the switch-on button avoiding groove 206, the width of which in the movement direction of the switch-on button 20 is larger than the width of the first locking member limiting protrusion 14*a*, enabling the switch-on button 20 and the switch-off button 21 to move and drive the circuit breaker to switch on and switch off;

when the circuit breaker is in the switch-on state, the button limiting groove 216 is misaligned with the first locking member limiting protrusion 14*a*, and the first locking member limiting protrusion 14*a* is positioned in the switch-on button avoiding groove 206, so that the switch-off button 21 prevents the first locking member 1*a* from moving toward the inside of the circuit breaker housing 1; when the circuit breaker is in the switch-off state, the button limiting groove 216 is arranged opposite to the first locking member limiting protrusion 14*a*, so that the first locking member 1*a* can move toward the inside of the circuit breaker housing 1 under an external force of retraction, enabling the first locking member limiting protrusion 14*a* to slide into the button limiting groove 216.

Preferably, the circuit breaker further includes a locking mechanism co-operated with the button mechanism 2, the locking mechanism includes a second locking member 1*b* pivotally arranged on the circuit breaker housing 1, and the second locking member 1*b* includes a second locking end 13*b;* pressing the switch-on button 20 to actuate the operating mechanism enables the circuit breaker to switch on, and simultaneously enables the switch-off button 21 to move toward the outside of the circuit breaker housing 1, and the switch-on button 20 and/or the switch-off button 21 actuate the second locking member 1*b* to rotate, so that the second locking end 13*b* protrudes outside the circuit breaker housing 1, and the second locking member 1*b* is limited at a position by the switch-on button 20 and/or the switch-off button 21 and cannot retract into the inside of the circuit breaker housing 1; pressing the switch-off button 21 to actuate the operating mechanism enables the circuit breaker to switch off, and simultaneously enables the switch-on button 20 to move toward the outside of the circuit breaker housing 1, and the switch-on button 20 and/or the switch-off button 21 actuate the second locking member 1*b* to rotate, so that the second locking end 13*b* retracts inside the circuit breaker housing 1.

Preferably, the switch-on button 20 includes a switch-on button driving part 207 drivingly co-operated with the second locking member 1*b*, and the switch-off button 21 includes a switch-off button driving portion 217 drivingly co-operated with the second locking member 1*b*; when the circuit breaker switches on, the switch-off button 21 driving the second locking member 1*b* to rotate through the switch-off button driving portion 217 enables the second locking end 13*b* to protrude outside the circuit breaker housing 1, and the switch-off button driving portion 217 withstanding the second locking end 13*b* enables the second locking end 13*b* not to retract into the circuit breaker housing 1; when the circuit breaker switches off, the switch-on button 20 driving the second locking member 1*b* to rotate through the switch-on button driving portion 207 enables the second locking end 13*b* to retract into the circuit breaker housing 1, and the switch-on button driving portion 207 restricting the second locking end 13*b* enables the second locking end 13*b* to be kept inside the circuit breaker housing 1.

Preferably, the second locking member 1*b* includes a second locking member mounting portion 10*b* pivotally connected to the circuit breaker housing 1, a locking member's first activated portion 11*b* drivingly co-operated with the switch-off button 21, a locking member's second activated portion 12*b* drivingly co-operated with the switch-on button 20 and a second locking end 13*b*; when the circuit breaker switches on, the switch-off button 21 driving the second locking member 1*b* to rotate through the locking member's first activated portion 11*b* enables the second locking end 13*b* to protrude outside the circuit breaker housing 1; when the circuit breaker switches off, the switch-on button 20 driving the second locking member 1*b* to rotate through the locking member's second activated portion 12*b* enables the second locking end 13*b* to retract into the circuit breaker housing 1;

the second locking member 1*b* is stacked with the switch-on button 20 and the switch-off button 21 in a thickness direction of the circuit breaker.

Preferably, the locking member's first activated portion 11*b* includes a locking member's first activated protrusion 110*b* protruding toward one side of the switch-off button 21, and the locking member's second activated portion 12*b* includes a locking member's second activated protrusion 120*b* protruding toward one side of the switch-on button 20;

the switch-on button driving portion 207 includes a switch-on button driving bevel 2070 drivingly co-operated with the locking member's second activated protrusion 120*b*, the switch-off button driving portion 217 includes a switch-off button driving bevel 21700 drivingly co-operated with the locking member's first activated protrusion 110*b*, the tilt direction of the switch-on button driving bevel 2070 is opposite to that of the switch-off button driving bevel 21700, and the locking member's first activated protrusion 120*b* and the locking member's second activated protrusion 120*b* are positioned between the switch-off button driving bevel 21700 and the switch-on button driving bevel 2070;

when pressing the switch-on button 20 enables the circuit breaker to switch on, the switch-on button driving bevel 2070 moves toward the inside of the circuit breaker housing 1 along with the switch-on button 20 to leave off the second locking member 1*b*, meanwhile, the switch-off button driving bevel 21700 moves toward the outside of the circuit breaker housing 1 along with the switch-off button 21, the switch-off button driving bevel 21700 driving the second locking member 1*b* to rotate through the locking member's first activated protrusion 110*b* enables the second locking end 13*b* to protrude outside the circuit breaker housing 1, and the switch-off button driving bevel 21700 withstanding the locking member's first activated portion 11*b* enables the second locking member 1*b* not to retract into the circuit breaker housing 1;

when pressing the switch-off button 21 enables the circuit breaker to switch off, the switch-off button driving bevel 21700 moves toward the inside of the circuit breaker housing 1 along with the switch-off button 21 to leave off the second locking member 1*b*, meanwhile, the switch-on button driving bevel 2070 moves toward the outside of the circuit breaker housing 1 along with the switch-on button 20, the switch-on button driving bevel 2070 pressing the locking member's second activated protrusion 120*b* enables the second locking end 13*b* to retract into the circuit breaker housing 1, and the switch-on button driving bevel 2070 limiting the second locking member 1*b* enables the latter to be kept inside the circuit breaker housing 1.

In the circuit breaker of the present invention, the button mechanism includes the switch-on button and the switch-off button, which can be respectively pressed by users to actuate the circuit breaker to switch on/switch off, and the switch-on button moves in the direction opposite to the movement of the switch-off button, that is, when the switch-on button/switch-off button is pressed toward the inside of the circuit breaker housing to enable the circuit breaker to switch on/switch off, the switch-off button/switch-on button will move toward the outside of the circuit breaker housing, in other words, users can distinguish the states of the circuit breaker (switch-on or switch-off state) by observing the states of the switch-on button and the switch-off button. Firstly, compared with the existing circuit breakers adopting a button mechanism which is pressed and pulled to enable the circuit breaker to switch on/switch off, the circuit breaker of the present invention enables the circuit breaker to switch on/switch off by pressing the buttons, thereby preventing the circuit breaker from being mistakenly pulled out. Secondly, the states of the circuit breaker can be judged by observing the states of the switch-on button and the switch-off button, without necessity to set up a switch-on indicating apparatus and a switch-off indicating apparatus, respectively, simplifying the structure of the circuit breaker and saving the internal space of the circuit breaker, as well as helping to follow the trend of the miniaturization of the circuit breaker. Thirdly, the switch-on button operating end and the switch-off button operating end are arranged in the switch-on button hole and the switch-on button hole, respectively, and enable themselves not to protrude from the circuit breaker housing, avoiding misoperation of the circuit breaker due to accidental touch.

In addition, under the function of an external force for retraction the first locking member can retract into the inside of the circuit breaker housing and lock the switch-on button and/or switch-off button, preventing the circuit breaker from switching on. Thus, when the plug-in circuit breaker of the present invention is not assembled to the designated assembling position of the circuit breaker, the housing used assemble the circuit breaker of the present invention squeezes the first locking member, so as to move it toward the inside of the circuit breaker housing and lock the switch-on button and/or the switch-off button, avoiding the plug-in circuit breaker from switching on before installed to the designated position during the installation process, and ensuring the personal safety of users. Moreover, when the circuit breaker is in the switch-on state, the switch-on button and/or the switch-off button prevent the first locking member from moving toward the inside of the circuit breaker housing, therefore, once the circuit breaker switches on, the plug-in circuit breaker of the present invention cannot be installed to the assembling position of the circuit breaker, so as to ensure the circuit breaker to be installed to the assembling position of the circuit breaker in the switch-off state, as well as the circuit breaker not to be pulled out of the assembling position of the circuit breaker in the switch-on state, thereby ensuring the personal safety of users.

In addition, the second locking end of the second locking member protrudes from/retracts into the outside/inside of the circuit breaker housing in the switch-on/switch-off state of the circuit breaker, so as to prevent the circuit breaker from being installed to the assembling position of the circuit breaker in the switch-on state, or being pulled out of the assembling position of the circuit breaker in the switch-on state, ensuring the electrical safety and personal safety of users. Further, in the circuit breaker of the present invention, the button mechanism includes a switch-on button and a switch-off button, which can be respectively pressed by users to actuate the circuit breaker to switch on/switch off, and the switch-on button moves in the direction opposite to the movement of the switch-off button, that is, when the switch-on button/switch-off button is pressed toward the inside of the circuit breaker housing to enable the circuit breaker to switch on/switch off, the switch-on button/switch-off button will move toward the outside of the circuit breaker housing, in other words, users can distinguish the states stood by the circuit breaker (switch-on or switch-off state) by observing the states of the switch-on button and the switch-off button.

DETAILED DESCRIPTION OF SOME EMBODIMENTS

We further describe the embodiments of the plug-in circuit breaker according to the present invention as follows in combination with the examples shown in FIGS. 1-25. The plug-in circuit breaker of the present invention is not limited to the description of the following embodiments.

Figure 1:
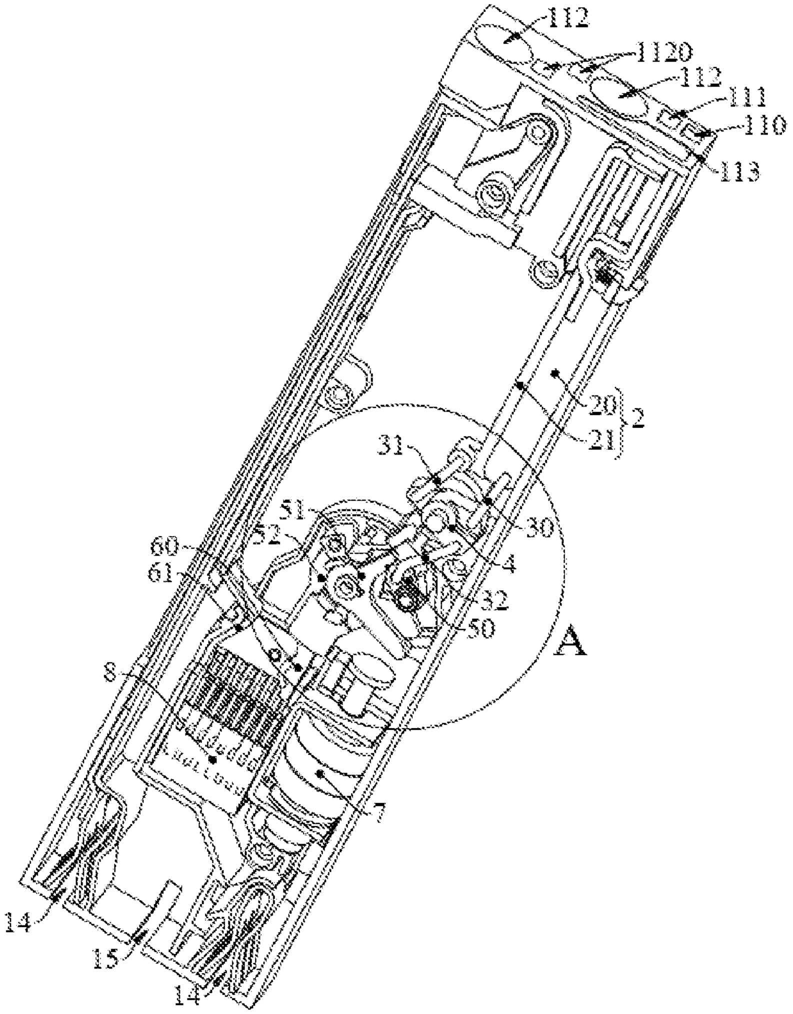
FIG. 1 is a structure diagram of the circuit breaker of the present invention, at least showing the structure of the operating mechanism.

As shown in FIG. 1, the circuit breaker of the present invention, especially a plug-in circuit breaker, comprises the circuit breaker housing 1, the button mechanism 2 arranged inside the circuit breaker housing 1, an operating mechanism connected with the button mechanism 2, the movable contact 60 connected with the operating mechanism, the stationary contact static contact co-operated with the movable contact 60, and the button mechanism 2 being operated to enable the circuit breaker to switch on/switch off by means of the operating mechanism, which enables the movable contact 60 and the static contact 61 to be connected/disconnected.

Of course, following an actual need, as shown in FIG. 1, the circuit breaker of the present invention may further comprises the short-circuit protection mechanism 7, an overload protection mechanism and the arc-extinguishing system 8 all arranged inside the circuit breaker housing 1. The short-circuit protection mechanism 7 and the overload protection mechanism actuate the operating mechanism to enable the circuit breaker to trip off when short-circuit and overload faults occur in the circuit breaker, respectively, so as to basically function as a circuit protector. The arc-extinguishing system 8 is used to extinguish the are generated at the disconnection of the movable contact 60 and the static contact 61, helping to improve the disconnection performance of the circuit breaker and improve the safety of electricity consumption.

Figure 2:
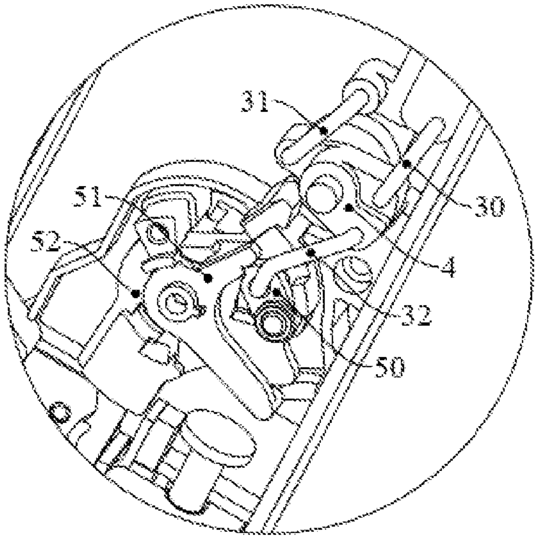
FIG. 2 is an enlarged structure diagram at A in FIG. 1 of the present invention.
Figure 3:
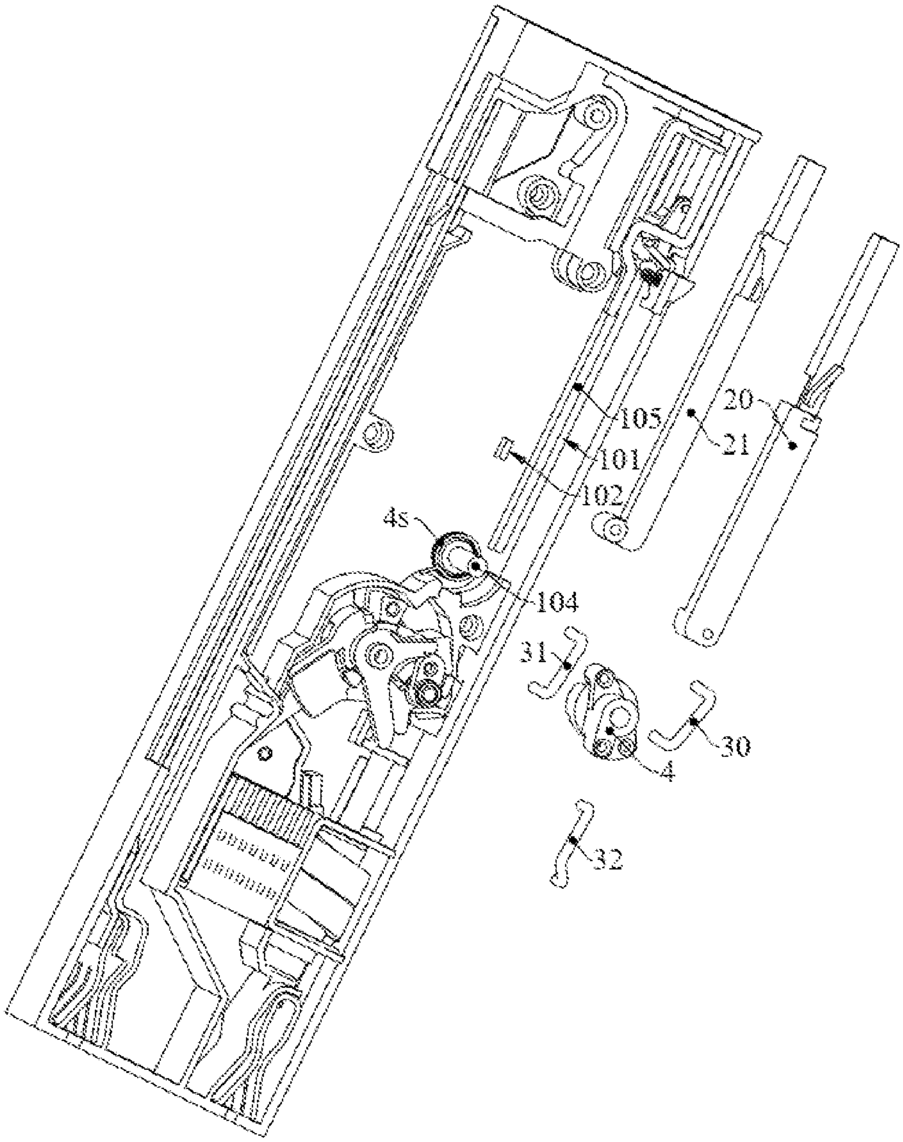
FIG. 3 is an exploded view of the circuit breaker of the present invention, at least showing the first embodiment of the first track mechanism and the second track mechanism.

As shown in FIGS. 1-3, the circuit breaker housing 1 includes the switch-on button hole 110 and the switch-off button hole 111 all arranged thereon. The button mechanism 2 includes the switch-on button 20 and the switch-off button 21 slidably arranged inside the circuit breaker housing 1, respectively. The switch-on button 20 includes a switch-on button operating end arranged at one end thereof and slidably arranged in the switch-on button hole 110. The switch-off button 21 includes a switch-off button operating end arranged at one end thereof and slidably arranged in the switch-off button hole 111. While the switch-on button operating end/switch-off button operating end is being pressed toward the inside of the circuit breaker housing 1 to enable the circuit breaker to switch on/switch off, correspondingly switch-off button operating end/switch-on button operating end moves toward the outside of the circuit breaker housing 1.

Further, as shown in FIGS. 1-2, the operating mechanism includes a bar linkage, and the transmission member 4 and a lever mechanism all pivotally arranged inside the circuit breaker housing 1. The bar linkage includes the switch-on connecting rod 30, the switch-off connecting rod 31 and the transmission connecting rod 32. The reverse end of the switch-on button 20 is drivingly connected to the transmission member 4 through the switch-on connecting rod 30, and the reverse end of the switch-off button 21 is drivingly connected to the transmission member 4 through the switch-off connecting rod 31. The transmission member 4 is drivingly connected with the lever mechanism through the transmission connecting rod 32, and the lever mechanism is connected with the movable contact 60 of the circuit breaker. When the switch-on button 20 is pressed to enable the circuit breaker to switch on, the switch-on button 20 actuates the transmission member 4 to rotate in a first direction through the switch-on connecting rod 30, meanwhile, the rotation of the transmission member 4 drives the switch-off button 21 to move toward the outside of the circuit breaker housing 1 through the switch-off connecting rod 31. When the switch-off button 21 is pressed to enable the circuit breaker to switch off, the switch-off button 21 actuates the transmission member 4 to rotate in a second direction through the switch-off connecting rod 31, meanwhile, the rotation of the transmission member 4 drives the switch-on button 20 to move toward the outside of the circuit breaker housing 1 through the switch-on connecting rod 30, the first direction and the second direction are opposite to each other. Among them, the transmission member 4 similarly functions as a handle of a traditional small-sized circuit breaker, and the switch-on button 20 and the switch-off button 21 interact with the transmission member 4 through the connecting rods. The lever mechanism may adopt the existing solutions such as a four-bar linkage or a multi-bar linkage.

The present invention has an improvement in that the button mechanism 2 includes the switch-on button 20 and the switch-off button 21, which can be respectively pressed by users to actuate the circuit breaker to switch on/switch off, and the switch-on button 20 moves in the direction opposite to the movement of the switch-off button 21, that is, while the switch-on button 20/switch-off button 21 is being pressed toward the inside of the circuit breaker housing 1 to enable the circuit breaker to switch on/switch off, the corresponding switch-on button 20/switch-off button 21 will move toward the outside of the circuit breaker housing 1, in other words, users can distinguish the states stood by the circuit breaker (switch-on or switch-off state) by observing the states of the switch-on button 20 and the switch-off button 21. Firstly, compared with the existing circuit breaker adopting a mechanism which is pressed and pulled to enable the circuit breaker to switch on/switch off, the circuit breaker of the present invention enables the circuit breaker to switch on/switch off by pressing the button, thereby preventing the circuit breaker from being mistakenly pulled out. Secondly, the states of the circuit breaker can be judged by observing the states of the switch-on button 20 and the switch-off button 21, without necessity to set up a switch-on indicating apparatus and a switch-off indicating apparatus, respectively, simplifying the structure of the circuit breaker and saving the internal space of the circuit breaker, as well as helping to follow the trend of the miniaturization of the circuit breaker.

Preferably, as shown in FIGS. 10-24, the circuit breaker of the present invention further includes a locking mechanism and an unlocking mechanism arranged inside the circuit breaker housing 11. As shown in FIGS. 10-18, the locking mechanism includes the first locking member 1*a* with one end protruding outside the circuit breaker housing 1, the locking member opening 17 arranged on the circuit breaker housing 1 for co-operation with the locking mechanism, and an assembling limiting hole arranged on the assembling position housing of the circuit breaker housing. When the circuit breaker is assembled to the designated position, the locking member opening 17 of the plug-in circuit breaker corresponds to the assembling limiting hole, and when the plug-in circuit breaker is not assembled to the designated position, the locking member opening 17 of the plug-in circuit breaker is misaligned with the assembling limiting hole, enabling the assembling position housing to screen the locking member opening 17, as it pertains to the prior art in the art, details for it are not described herein again.

The present invention has another improvement in the structure of locking and co-operating. When the circuit breaker is in the switch-off state, one end of the first locking member 1*a* extends from the locking member opening 17 and protrudes outside the circuit breaker housing 1, and the first locking member 1*a* can retract into the inside of the circuit breaker housing 1 under the function of an external force for retraction, and the first locking member 1*a* is co-operated with the switch-on button 20 and/or the switch-off button 21 in a position-limit way, locking the switch-on button 20 and/or the switch-off button 21 to enable the circuit breaker not to switch on. When the circuit breaker is in the switch-on state, one end of the first locking member 1*a* protrudes outside the circuit breaker housing 1, and the first locking member 1*a* can not retract into the inside of the circuit breaker housing 1 at a position limited by the switch-on button 20 and/or the switch-off button 21. When the first locking member 1*a* protrudes outside the circuit breaker housing 1, the first locking member 1*a* does not lock the switch-on button 20 and/or the switch-off button 21, then the switch-on button 20 and/or the switch-off button 21 can normally perform switch-on and switch-off operations.

Preferably, as shown in FIGS. 10-17, before the circuit breaker is installed to the assembling position of the circuit breaker, if the circuit breaker is in the switch-on state, one end of the first locking member 1*a* protrudes outside the circuit breaker housing 1 and can not retract into the inside of the circuit breaker housing 1 because the limitation by the switch-on button 20 and/or the switch-off button 21, so that the circuit breaker cannot be inserted and installed into the assembling position of the circuit breaker in the switch-on state.

While the circuit breaker is being installed to the assembling position of the circuit breaker, the assembling position housing of the circuit breaker applies an external force for retraction on the first locking member 1*a* during the assembling process, which squeezes the first locking member 1*a* to enable it move toward the inside of the circuit breaker housing 1 and retract into the inside of the circuit breaker housing 1, and enables the first locking member 1*a* to be co-operated with the switch-on button 20 and/or the switch-off button 21 in a position-limit way, locking the switch-on button 20 and/or the switch-off button 21, so as to prevent the circuit breaker from switching on, and enable the circuit breaker not to switch on during the assembling process and improve safety.

After the circuit breaker has been assembled to the designated position, the locking member opening 17 corresponds to the assembling limiting hole, and the assembling position housing does not apply an external force for retraction on the first locking member 1*a*, so that the first locking member 1*a* protrudes outside the circuit breaker housing 1 again, unlocks the button mechanism 2 and co-operates with the assembling position housing in a position-limit way to enable the circuit breaker to normally switch on and switch off through the switch-on button 20 and/or the switch-off button 21, and prevents the circuit breaker from being pulled out from its assembling position at will, so as to ensure that the circuit breaker won't fall out from the assembling position of the circuit breaker due to the vibration during transportation.

After the circuit breaker has been assembled to the designated position, when the circuit breaker is in the switch-on state, the switch-on button 20 and/or the switch-off button 21 prevent the first locking member 1*a* from moving toward the inside of the circuit breaker housing 1, so that the circuit breaker cannot be pulled out from the assembling position of the circuit breaker in the switch-on state.

Further, as shown in FIGS. 10-13 and 18, when the circuit breaker is in the switch-off state, operating the unlocking mechanism enables the first locking member 1*a* to move toward the inside of the circuit breaker housing 1, and retract into the inside of the circuit breaker housing 1, releasing the position-limiting co-operation of the first locking member 1*a* with the assembling position housing and making its co-operation with the button mechanism 2.

Of the locking mechanism of the circuit breaker of the present invention, the first locking member 1*a* locks the switch-on button 20 and/or the switch-off button 21 by means of its co-operation with the switch-on button 20 and/or the switch-off button 21 at installation to the assembling position of the circuit breaker, avoiding the circuit breaker from switching on due to the user's misoperation/accidental touch during the installation process of the circuit breaker, and ensuring user's personal safety. Moreover, when the circuit breaker is in the switch-on state, the switch-on button 20 and/or the switch-off button 21 prevent the first locking member from moving toward the inside of the circuit breaker housing 1, that is, once the circuit breaker switches on, it cannot be installed to its assembling position, or pulled out from its assembling position at will, so as to ensure it to be installed to its assembling position in the switch-off state, or to be pulled out of its assembling position, thereby ensuring the personal safety of users.

It should be pointed out that the "locking/unlocking the button mechanism 2" refers to making position-limiting co-operation/releasing position-limiting co-operation with the button mechanism 2 through the first locking member 1*a* to prevent/allow the switch-on button 20 and/or the switch-off button 21 from moving/to move in the designated direction (ie a switch-on direction or a switch-off direction).

After the circuit breaker has been assembled to the assembling position of the circuit breaker and into the designated position, the first locking member 1*a* is co-operated with the assembling position housing of the circuit breaker in a position-limit way. The unlocking mechanism includes an independent pulling member 2*a* drivingly co-operated with the first locking member 1*a*. When the circuit breaker is in the switch-off state, pulling the pulling member 2*a* enables the first locking member 1*a* to move towards the inside of the circuit breaker housing 1, and retract into the inside of the circuit breaker housing 1, so as to release the position-limiting co-operation of the first locking member 1*a* with the assembling position housing, so that the circuit breaker can be pulled out of the assembling position housing of the circuit breaker. Further, as shown in FIGS. 10-13, the unlocking mechanism further includes a linkage member 3*a*, of which one end is drivingly co-operated with the first locking member 1*a*, and the other end is drivingly co-operated with the pulling member 2*a*. Pulling the pulling member 2*a* enables the linkage member 3*a* to rotate, and the linkage member 3*a* drives the first locking member 1*a* to move towards the inside of the circuit breaker housing 1, retract into the inside of the circuit breaker housing 1 and release its position-limiting co-operation with the assembling position housing. Compared with the existing circuit breaker which releases the position-limiting co-operation with the assembling position housing by pulling the button, the present invention has yet another improvement in that the circuit breaker is independently provided with the pulling member 2*a* of the unlocking mechanism, instead of unlocking the first locking member through the button mechanism, thereby avoiding the circuit breaker from being mistakenly pulled out by the pulling button. Moreover, in the unlocking mechanism of the present invention, the pulling member 2*a* is drivingly co-operated with the first locking member 1*a* through the linkage member 3*a*, thereby improving the fault tolerance of the unlocking mechanism, lowering requirements for the structural accuracy of the pulling member 2*a*, the linkage member 3*a* and the first locking member 1*a* and helping to reduce production difficulty and improve production efficiency.

Preferably, as shown in FIGS. 21-24, the locking mechanism includes the second locking member 1*b* pivotally arranged on the circuit breaker housing 1, and the second locking member 1*b* includes the second locking end 13*b*. Pressing the switch-on button 20 to actuate the operating mechanism enables the circuit breaker to switch on, and simultaneously enables the switch-off button 21 to move toward the outside of the circuit breaker housing 1, and the switch-on button 20 and/or the switch-off button 21 actuate the second locking member 1*b* to rotate, so that the second locking end 13*b* protrudes outside the circuit breaker housing 1, and the second locking member 1*b* is limited at a position by the switch-on button 20 and/or the switch-off button 21 and cannot retract into the inside of the circuit breaker housing 1. Pressing the switch-off button 21 to actuate the operating mechanism enables the circuit breaker to switch off, and simultaneously enables the switch-on button 20 to move toward the outside of the circuit breaker housing 1, and the switch-on button 20 and/or the switch-off button 21 actuate the second locking member 1*b* to rotate reversely, so that the second locking end 13*b* retracts inside the circuit breaker housing 1.

Figure 22:
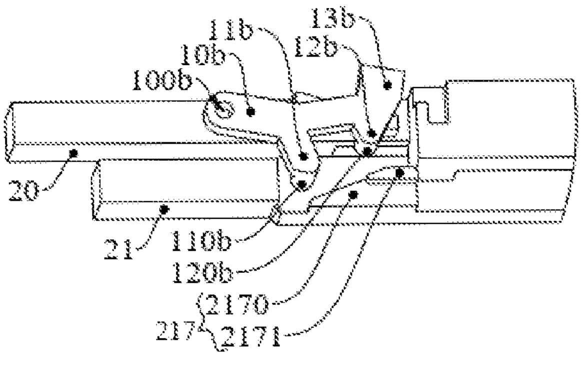
FIG. 22 is a schematic diagram showing the cooperation of the second locking member and the button mechanism of the present invention, where the circuit breaker is in the switch-off state, the switch-on button drives the second locking member to rotate, so that the second locking end retracts into the circuit breaker housing.
Figure 24:
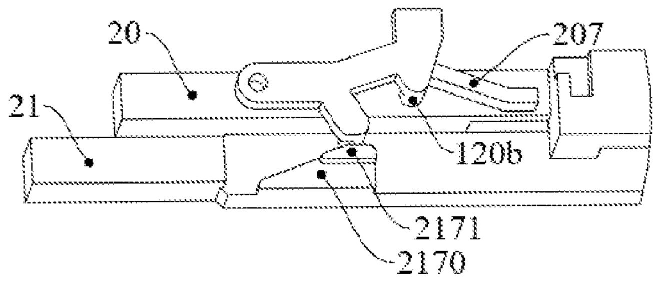
FIG. 24 is a schematic diagram showing the cooperation of the second locking member and the button mechanism of the present invention, where the circuit breaker is in the switch-on state, the switch-off button drives the second locking member to rotate, so that the second locking end protrudes outside the circuit breaker housing.

Further, as shown in FIGS. 22 and 24, when the circuit breaker switches on, the switch-off button 21 actuates the second locking member 1*b* to rotate, so that the second locking end 13*b* protrudes outside the circuit breaker housing 1; when the circuit breaker switches off, the switch-on button 20 actuates the second locking member 1*b* to rotate, so that the second locking end 13*b* retracts into the inside of the circuit breaker housing 1. Of course, when the circuit breaker switches on, the switch-on button 20 may actuate the second locking end 13*b* to protrude outside the circuit breaker housing 1; and when the circuit breaker switches off, the switch-off button 21 may actuate the second locking end 13*b* to retract into the inside of the circuit breaker housing. In the circuit breaker of the present invention, the locking mechanism further includes the second locking member 1*b*, and the second locking end 13*b* of the second locking member 1*b* protrudes from the outside of the circuit breaker housing when the circuit breaker switches on, thereby preventing the circuit breaker from being installed to the assembling position of the circuit breaker in the switch-on state, or being pulled out of the assembling position of the circuit breaker in the switch-on state, and ensuring the electrical safety and personal safety of users.

It should be noted that the first locking member 1*a* and the second locking member 1*b* of the locking mechanism of the present invention function in some same ways as well as different ways, so they can coexist with each other to improve the electrical safety of the circuit breaker, of course, there may be only the first locking member 1*a* or the second locking member 1*b* provided in the locking mechanism. In the case that the first locking member 1*a* and the second locking member 1*b* are both provided in the locking mechanism, when the circuit breaker switches on outside the assembling position of the circuit breaker, the first locking member 1*a* and the second locking member 1*b* both protrude from the circuit breaker housing, so as to enable the circuit breaker not to be installed into the assembling position of the circuit breaker; when the circuit breaker is installed to the assembling position of the circuit breaker, but not to the designated position, the assembling position housing presses the first locking member 1*a* back into the circuit breaker housing, preventing the switch-on button from switching on; after the circuit breaker has been installed to the assembling position of the circuit breaker and to the designated position and it has switched on, the first locking member 1*a* and the second locking member 1*b* both protrude from the circuit breaker housing, and cannot be unlocked, the circuit breaker cannot be pulled out from the assembling position of the circuit breaker; after the circuit breaker has been installed to the assembling position of the circuit breaker and it has switched off, the second locking member 1*b* retracts into the circuit breaker housing, and the first locking member 1*a* still protrudes from the circuit breaker housing to prevent the circuit breaker from separating from the assembling position of the circuit breaker under shakes during transportation, etc.; after the circuit breaker has been installed to the assembling position of the circuit breaker and it has broken contact, pulling the pulling member 2*a* outwards enables the first locking member 1*a* to be pulled back into the circuit breaker housing to unlock, next continuously pulling the first locking member 1*a* enables the circuit breaker to be pulled out of the cabinet.

Figure 19:
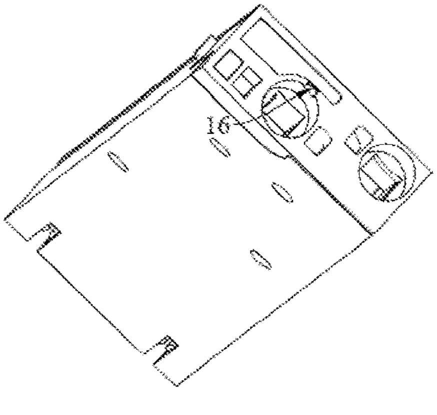
FIG. 19 is a structure diagram of the circuit breaker housing of the present invention, where the pulling member' dig slot is arranged between the second wire-outlet hole and the pulling member operating hole.
Figure 20:
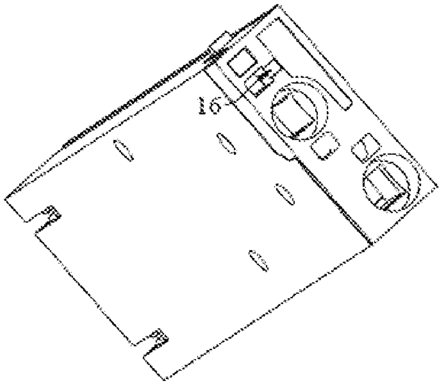
FIG. 20 is a structure diagram of the circuit breaker housing of the present invention, where the pulling member' dig slot is arranged between the switch-off button hole and the pulling member operating hole.
Figure 21:
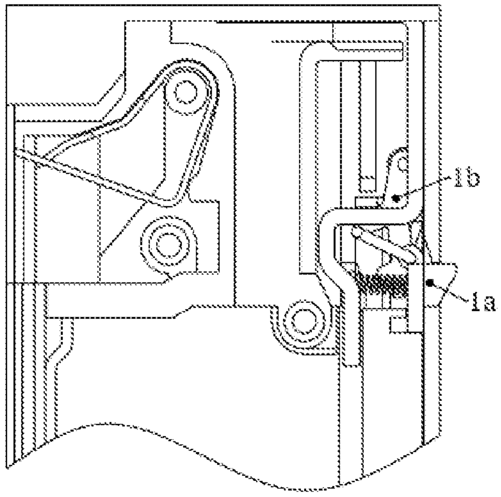
FIG. 21 is an assembly structure diagram of the second locking member of the present invention.
Figure 25:
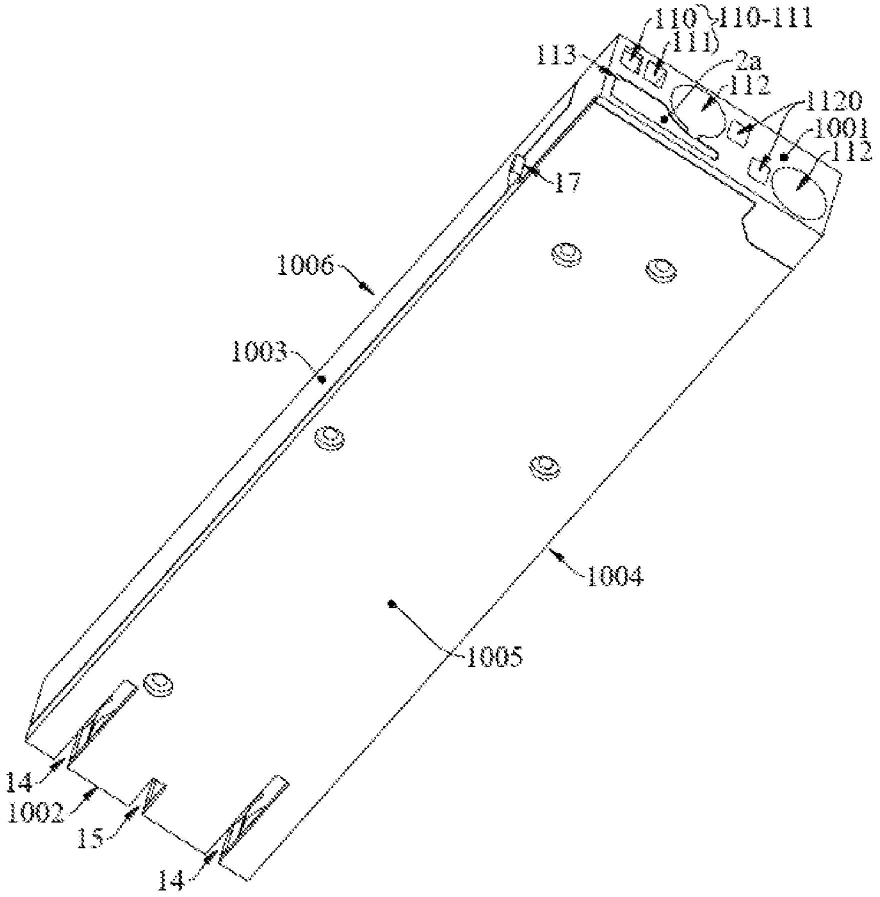
FIG. 25 is a structure diagram of the circuit breaker housing of the present invention, showing the positional relationship of the button hole, the wire-outlet hole, the wire-removing hole and the pulling member operating hole.

Preferably, as shown in FIGS. 19, 20 and 25, an embodiment of the circuit breaker housing 1 is provided.

The circuit breaker housing 1 is integrally formed into a hexahedral structure, including the front side wall 1001 and the rear side wall 1002 arranged oppositely, the wire-outlet holes 112, the button holes 110-111 and the pulling member operating hole 113 arranged on the front side wall 1001, and the wire-inlet holes 14 arranged on the rear side wall 1002. The wire-outlet holes 112, the button holes 110-111 and the pulling member operating hole 113 of the circuit breaker housing 1 are centrally arranged on the front side wall 1001, more easing operation for users, and the wire-inlet holes 14 are arranged on the rear side wall 1002 opposite to the front side wall 1001, helping to increase the creepage distance between the wire-inlet end and the wire-outlet end, and improve the insulation performance of the circuit breaker. Further, as shown in FIG. 25, the button holes 110-111 include the switch-on button hole 110 and the switch-off button hole 111 arranged side by side. As for the above structure, it is easy to separately set up the switch-on button and the switch-off button of the circuit breaker, thereby enabling the circuit breaker to switch on/switch off through different structures. Compared with the existing circuit breaker enabling a circuit breaker to switch on/switch off by pressing/pulling a button, the structure avoids the circuit breaker from being pulled out with an excessive force when the circuit breaker switches off by pulling the button.

We shall further describe the circuit breaker of the present invention with reference to the figures and examples as follows.

As shown in FIGS. 1-3, the circuit breaker of the present invention is a plug-in circuit breaker, comprising the circuit breaker housing 1, the button mechanism 2 arranged inside the circuit breaker housing 1, an operating mechanism connected with the button mechanism 2, the movable contact 60 connected with the operating mechanism, the static contact 61 co-operated with the movable contact 60, and the button mechanism 2 being operated to enable the circuit breaker to switch on/switch off by means of the operating mechanism, which enables the movable contact 60 and the static contact 61 to be connected/disconnected. Of course, following an actual need, as shown in FIG. 1, the circuit breaker of the present invention may further comprises the short-circuit protection mechanism 7, an overload protection mechanism and the arc-extinguishing system 8 all arranged inside the circuit breaker housing 1. The short-circuit protection mechanism 7 and the overload protection mechanism actuate the operating mechanism to enable the circuit breaker to trip off when short-circuit and overload faults occur in the circuit breaker, respectively, so as to basically function as a circuit protector. The arc-extinguishing system 8 is used to extinguish the are generated at the disconnection of the movable contact 60 and the static contact 61, helping to improve the disconnection performance of the circuit breaker and improve the safety of electricity consumption. Further, the short-circuit protection mechanism 7 and the overload protection mechanism are an electromagnetic release and a dual metal piece drivingly co-operated with the operating mechanism, respectively. The arc-extinguishing system 8 is an arc-extinguishing chamber arranged on one side of the movable contact and the static contact 61, and involves side walls of the arc-extinguishing chamber and a plurality of arc-extinguishing sheets arranged between the side walls of the arc-extinguishing chamber.

Preferably, as shown in FIGS. 1-9, an embodiment of the operating mechanism is provided.

As shown in FIGS. 1-2, the circuit breaker housing 1 includes the switch-on button hole 110 and the switch-off button hole 111 all arranged thereon. The button mechanism 2 includes the switch-on button 20 and the switch-off button 21 slidably arranged inside the circuit breaker housing 1, respectively. The switch-on button 20 includes a switch-on button operating end arranged at one end thereof and slidably arranged in the switch-on button hole 110. The switch-off button 21 includes a switch-off button operating end arranged at one end thereof and slidably arranged in the switch-off button hole 111. While the switch-on button operating end/switch-off button operating end is being pressed toward the inside of the circuit breaker housing 1 to enable the circuit breaker to switch on/switch off, the switch-off button operating end/switch-on button operating end moves toward the outside of the circuit breaker housing 1.

Further, as shown in FIGS. 1-2, the operating mechanism includes a bar linkage, and the transmission member 4 and a lever mechanism all pivotally arranged inside the circuit breaker housing 1. The bar linkage includes the switch-on connecting rod 30, the switch-off connecting rod 31 and the transmission connecting rod 32. The reverse end of the switch-on button 20 is drivingly connected to the transmission member 4 through the switch-on connecting rod 30, and the reverse end of the switch-off button 21 is drivingly connected to the transmission member 4 through the switch-off connecting rod 31. The transmission member 4 is drivingly connected with the lever mechanism through the transmission connecting rod 32, and the lever mechanism is connected with the movable contact 60 of the circuit breaker. When the switch-on button 20 is pressed toward the inside of the circuit breaker housing 1 to enable the circuit breaker to switch on, the switch-on button 20 actuates the transmission member 4 to rotate in a first direction through the switch-on connecting rod 30, meanwhile, the rotation of the transmission member 4 drives the switch-off button 21 to move toward the outside of the circuit breaker housing 1 through the switch-off connecting rod 31. When the switch-off button 21 is pressed toward the inside of the circuit breaker housing 1 to enable the circuit breaker to switch off, the switch-off button 21 actuates the transmission member 4 to rotate in a second direction through the switch-off connecting rod 31, meanwhile, the rotation of the transmission member 4 drives the switch-on button 20 to move toward the outside of the circuit breaker housing 1 through the switch-on connecting rod 30, so the first direction and the second direction are opposite to each other.

Further, as shown in FIGS. 1-2, the lever mechanism includes the jump buckle 50, the lock catch 51 and the rotating plate 52. The rotating plate 52 is pivotally arranged on the circuit breaker housing 1, the jumper buckle 50 and the lock catch 51 are locked with each other and pivotally arranged on the rotating plate 52, respectively. The rotating plate 52 is connected with the movable contact 60, and the transmission member 4 is drivingly connected with the jumper buckle 50 through the transmission connecting rod 32. The transmission member 4 rotates in the first direction and drives the lever mechanism to rotate in the first direction in their entirety through the transmission connecting rod 32, and the lever mechanism drives the movable contact 60 to sway, as so to enable the circuit breaker to switch on. The transmission member 4 rotates in the second direction, and drives the jump buckle 50 to rotate in the second direction through the transmission connecting rod 32, so that the jump buckle 50 and the lock catch 51 are released from each other, so as to enable the circuit breaker to switch off. When a short-circuit or overload fault occurs in the circuit breaker, the short-circuit protection mechanism 7 or the overload protection mechanism actuates the lock catch 51 to release the lock catch 51 from the jump buckle 50, so as to enable the circuit breaker to trip off and achieve self-protection. Further, the movable contact 60 is connected with the rotating plate 52 through an elastic member to enable the movable contact 60 to operate beyond a stroke. Of course, other solutions may also be adopted for the lever mechanism, all within the protection scope of the present invention. Preferably, as shown in FIG. 6, an embodiment of the transmission member 4 is provided.

Figure 6:
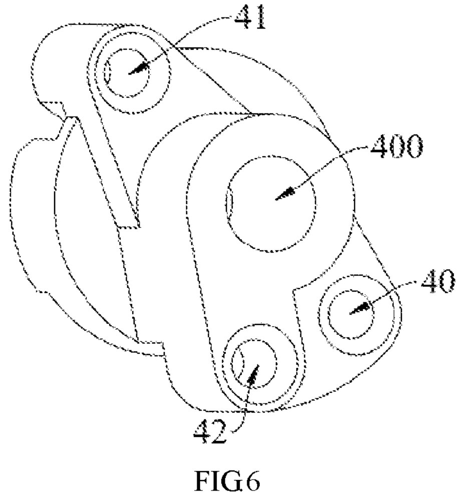
FIG. 6 is a structure diagram of the transmission member of the present invention.

As shown in FIG. 6, the transmission member 4 includes the transmission member axle hole 400, the first connection hole 40, the second connection hole 41 and the third connection hole 42. The first connection hole 41, the second connection hole 41 and the third connection hole 42 are positioned at three vertices of a triangle thereon, respectively. The transmission member axle hole 400 is arranged in the middle of the transmission member 4. The first connection hole 40 and the third connection hole 42 are arranged on one side of the transmission member axle hole 400, and the second connection hole 41 is arranged on the other side of the transmission member axle hole 400. The transmission member 4 is pivotally arranged on the circuit breaker housing 1 through its transmission member axle hole 400, and the transmission member 4 is connected to the switch-on connecting rod 30, the switch-off connecting rod 31 and the transmission connecting rod 32 by means of the first connection hole 40, the second connection hole 41 and the third connection hole 42, respectively.

Specifically, in the directions shown in FIG. 1, the upper, lower, left, and right sides of FIG. 1 correspond to the upper, lower, left, and right sides of the circuit breaker, respectively, and the side of FIG. 1 facing the reader corresponds to the front side of the circuit breaker. The switch-on button hole 110 and the switch-off button hole 111 are arranged on the upper side wall of the circuit breaker housing 1. The upper end of the switch-on button 20 is the switch-on button operating end slidably arranged inside the switch-on button hole 110, and the upper end of the switch-off button 21 is the switch-off button operating end slidably arranged inside the switch-off button hole 111. The lower end of the switch-on button 20 is drivingly connected to the first connection hole 40 at the right end of the transmission member 4 through the switch-on connecting rod 30, the lower end of the switch-off button 21 is drivingly connected to the second connection hole 41 at the left end of the transmission member 4 through the switch-off connecting rod 31, the third connection hole 42 at the right end of the transmission member 4 is drivingly connected to the jump buckle 50 through the transmission connecting rod 32, and the transmission member 4 is pivotally arranged on the transmission member-installing shaft 104 on the circuit breaker housing 1 through the transmission member axle hole 400 therein. The switch-on button 20 is pressed downwards, thus it drives the transmission member 4 to rotate clockwise (the first direction) through the switch-on connecting rod 30, meanwhile, the transmission member 4 drives the movable contact 60 to sway clockwise to switch on with the static contact 61 by means of the transmission connecting rod 31, the jump buckle 50 and the lock catch 51 co-operated with each other, and the rotating plate 52, thus the circuit breaker enters the switch-on state. The switch-off button 21 is pressed downwards, thus it drives the transmission member 4 to rotate counterclockwise (the second direction) through the switch-off connecting rod 31, meanwhile, the transmission member 4 drives the jump buckle 50 to sway counterclockwise through the transmission connecting rod 31, and release its locking co-operation with the lock catch 51, thus the rotating plate 52 drives the movable contact 60 to sway counterclockwise and switches off with the static contact 61, and the circuit breaker enters the switch-off state.

Preferably, the switch-on button operating end and the switch-off button operating end are provided with a first indicator and a second indicator for indicating the switch-on and switch-off states, respectively, and the first indicator and the second indicator both include a color mark and/or a symbol mark. The first indicator is used to indicate the switch-on state, and correspondingly the second indicator is used to indicate the switch-off state; or the first indicator is used to indicate the switch-off state, thus the second indicator is used to indicate the switch-on state. Further, the switch-on button operating end is different from the switch-off button operating end in the color mark and the symbol mark. For example, the color mark and the symbol mark of the switch-on button operating end may be red/SWITCH-OFF symbol (O), respectively; the color mark and the symbol mark of the switch-off button operating end may be green/SWITCH-ON symbol (I), respectively. When the circuit breaker switches on, the switch-on button operating end enters the switch-on button hole 110, and the switch-off button operating end is highlighted on the switch-off button hole 111, so it can be judged that the circuit breaker is in the switch-on state according to the green mark and/or the SWITCH-ON symbol (I).On the contrary, when the circuit breaker switches off, the switch-off button operating end enters the switch-off button hole 111, and the switch-on button operating end is highlighted on the switch-on button hole 110, so it can be judged that the circuit breaker is in the switch-off state according to the red mark and/or the SWITCH-OFF symbol (O). The first indicator and the second indicator on the switch-on button operating end and the switch-off button operating end help users to observe and judge the state of the circuit breaker more intuitively, so it is beneficial to improve users' electrical safety.

Preferably, as shown in FIGS. 3-5 and 7-9, the switch-on button 20 and the switch-off button 21 of the circuit breaker of the present invention both have a long-strip shape in their entirety, which are parallelly arranged and slidably and linearly installed inside the circuit breaker housing 1, which includes a first track mechanism and a second track mechanism used to respectively define the movement paths of the switch-on button 20 and the switch-off button 21.

Figure 4:
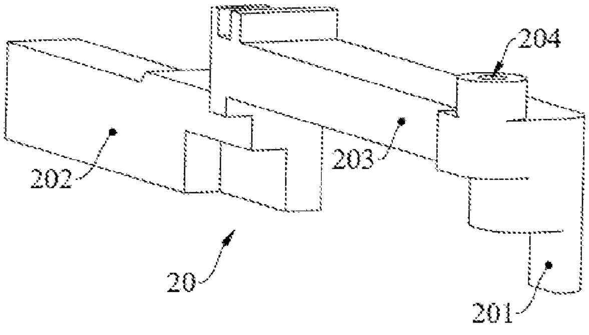
FIG. 4 is a structure diagram of the first embodiment of the switch-on button of the present invention.
Figure 5:
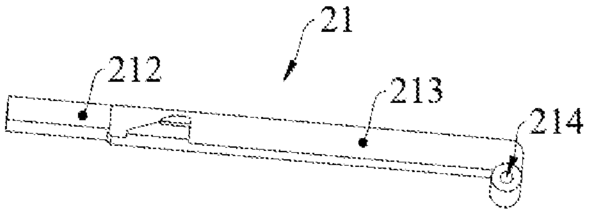
FIG. 5 is a structure diagram of the first embodiment of the switch-off button of the present invention.

As shown in FIGS. 3-5, the first embodiment of the first track mechanism and the second track mechanism is provided.

As shown in FIGS. 3-5, the first track mechanism includes the switch-on button track protrusion 201 arranged on the switch-on 20 and the switch-on button track groove 101 arranged on the circuit breaker housing, and the switch-on button track protrusion 20 is slidably arranged in the switch-on button track groove 101. The second track mechanism includes a switch-off button track groove arranged on the circuit breaker housing 1, and the switch-off button 21 is slidably arranged in the switch-off button track groove. Further, as shown in FIG. 3, the circuit breaker housing 1 includes the first rib 105, on both sides of which the switch-on button track groove 101 and the switch-off button track groove are respectively positioned. The switch-on button track groove 101 is formed by means of encirclement between the first rib 105 and a side wall of the circuit breaker housing 1 opposite to the first rib 105. The circuit breaker housing 1 further includes the second rib 102 opposite to the first rib 105, and the switch-off button track groove is formed by means of encirclement between the first rib 105 and the second rib 102.

Preferably, as shown in FIG. 4, the switch-on button 20 includes the switch-on button operating portion 202 and the switch-on button transmission portion 203. Of the switch-on button operating portion 202, one end is the switch-on button operating end, and the other end is connected to the switch-on button transmission portion 203 in overlap, the other end of the switch-on button transmission portion 203 is provided with the switch-on button connecting hole 204 and the switch-on button track protrusion 201. The switch-on button connecting hole 204 is connected with one end of the switch-on connecting rod 30 of the operating mechanism. The switch-on button track protrusion 201 and the switch-on button operating portion 202 are positioned at the same side of the switch-on button transmission portion 203. Specifically, in the directions shown in FIG. 4, of the switch-on button operating portion 202, the left end is the switch-on button operating end, and the right end is connected to the switch-on button transmission portion 203 in overlap, the right end of the switch-on button transmission portion 203 is provided with the switch-on button connecting hole 204 and the switch-on button track protrusion 201. The switch-on button track protrusion 201 and the switch-on button operating portion 202 are positioned at the lower side of the switch-on button transmission portion 203. Of course, the other end of the switch-on button operating portion 202 can also be horizontally connected with the switch-on button transmission portion 203, and positioned at the same plane, instead of overlap.

Preferably, as shown in FIG. 5, the switch-off button 21 includes the switch-off button operating portion 212 and the switch-off button transmission portion 213. Of the switch-off button operating portion 212, one end is the switch-off button operating end, and the other end is connected to one end of the switch-off button transmission portion 213, the other end of which is provided with the switch-off button connecting hole 214, which is connected with one end of the switch-off connecting rod 31 of the operating mechanism. Specifically, in the directions shown in FIG. 5, the switch-off button 21 has a long-strip shape in its entirety. Of the switch-off button operating portion 212, the left end is the switch-off button operating end, and the right end is connected to one end of the switch-off button transmission portion 213, the right end of which is provided with the switch-off button connecting hole 214. The switch-off button connecting hole 214 is positioned at the lower side of the switch-off button transmission portion 213.

Specifically, as shown in FIG. 3, the first rib 105 is arranged on the circuit breaker housing 1, and forms the switch-on button track groove 101 by means of encirclement with the left side wall of the circuit breaker housing 1. The second rib 102 is arranged on the right side of the first rib 105, and forms the switch-off button track groove by means of encirclement with the latter. The switch-on button operating end is slidably arranged in the switch-on button hole 110, meanwhile the switch-on button track protrusion 201 is slidably arranged in the switch-on button track groove 101 to define the movement path of the switch-on button 20. The switch-off button operating end is slidably arranged in the switch-off button hole 111, meanwhile, the switch-off button transmission portion 213 is slidably arranged between the first rib 105 and the second rib 102 to define the movement path of the switch-off button 21.

Figure 7:
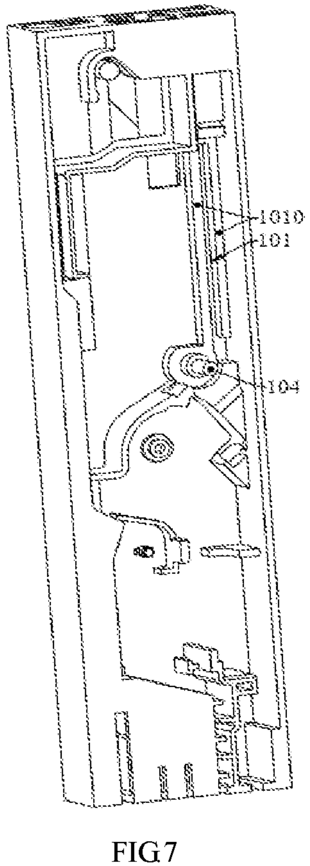
FIG. 7 is a structure diagram of the circuit breaker housing of the present invention, at least showing the second embodiment of the first track mechanism.
Figure 8:
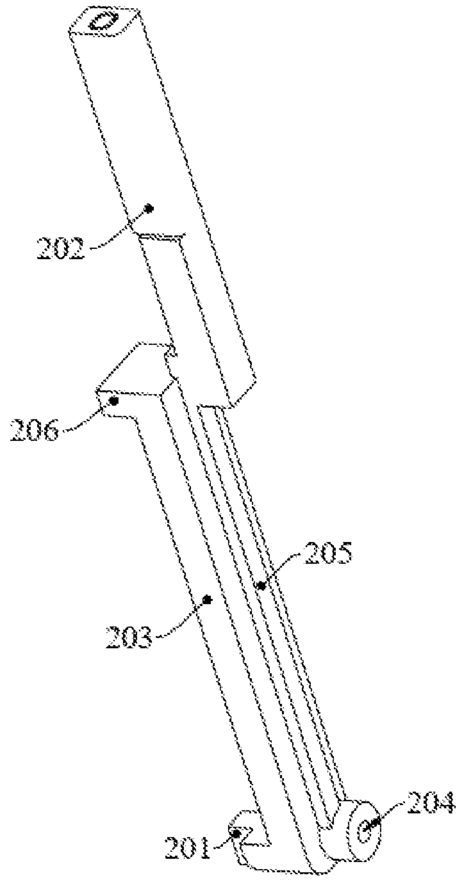
FIG. 8 is a structure diagram of the second embodiment of the switch-on button of the present invention.
Figure 9:
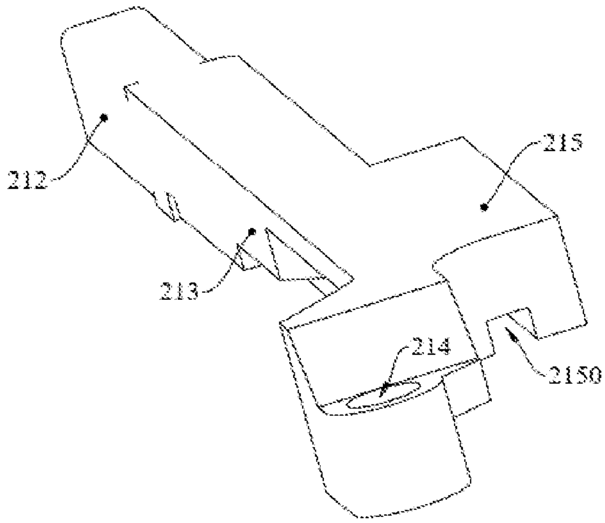
FIG. 9 is a structure diagram of the second embodiment of the switch-off button of the present invention.

As shown in FIGS. 7-9, the second embodiment of the first track mechanism and the second track mechanism is provided.

As shown in FIGS. 7-9, the first track mechanism includes the switch-on button track protrusion 201 arranged on the switch-on 20 and the switch-on button track groove 101 arranged on the circuit breaker housing, and the switch-on button track protrusion 201 is slidably arranged in the switch-on button track groove 101. The second track mechanism includes the switch-off button track bar 205 arranged on the switch-on button 20 and in the length direction of the switch-on button 20, and the switch-off button track groove 2150 arranged on the switch-off button 21, and the switch-off button track groove 2150 is slidably co-operated with the switch-off button track bar 205.

Preferably, as shown in FIG. 8, The switch-on button 20 includes the switch-on button operating portion 202, the switch-on button transmission portion 203 and the switch-off button track bar 205. Of the switch-on button operating portion 202, one end is the switch-on button operating end, and the other end is connected to the switch-on button transmission portion 203 in overlap, the other end of the switch-on button transmission portion 203 is provided with the switch-on button connecting hole 204 and the switch-on button track protrusion 201. The switch-off button track bar 205 is arranged on one side of the switch-on button transmission portion 203, and the switch-off button track bar 205 and the switch-on button operating portion 202 are positioned on the same side of the switch-on button transmission portion 203. The switch-on button connecting hole 204 is connected to one end of the switch-on connecting rod 30 of the operating mechanism. Specifically, in the directions shown in FIG. 8, of the switch-on button operating portion 202, the upper end is the switch-on button operating end, and the lower end is connected to the upper end of the switch-on button transmission portion 203 in overlap, the lower end of the switch-on button transmission portion 203 is provided with the switch-on button connecting hole 204 and the switch-on button track protrusion 201. The switch-off button track bar 205 is arranged between the switch-on button connecting hole 204 and the switch-on button operating portion 202, connected with the latter, respectively, and positioned on the right side of the switch-on button transmission portion 203. The switch-on button track protrusion 201 is arranged on the left side of the switch-on button transmission portion 203. Further, in the directions shown in FIG. 8, the switch-on button bottom foot 206 is arranged on the left side of the upper end of the switch-on button transmission portion 203.

Preferably, as shown in FIG. 9, the switch-off button 21 includes the switch-off button operating portion 212, the switch-off button transmission portion 213, the switch-off button track portion 215 and the switch-off button connecting hole 214. Of the switch-off button operating portion 212, one end is the switch-off button operating end, and the other end is connected to one end of the switch-off button transmission portion 213, the other end of which is provided with the switch-off button connecting hole 214. The switch-off button track portion 215 is arranged on one side of the switch-off button transmission portion 213, and the switch-off button track groove 2150 is arranged on the side of the switch-off button track portion 215 facing the switch-on button transmission portion 203. Specifically, in the directions shown in FIG. 9, of the switch-off button operating portion 212, the left end is the switch-off button operating end, and the right end is connected to the left end of the switch-off button transmission portion 213, the right end of which is provided with the switch-off button connecting hole 214. The switch-off button track portion 215 is arranged on the rear side of the right end of the switch-off button transmission portion 213, and the switch-off button track groove 2150 is arranged on the lower side of the switch-off button track portion 215.

Specifically, as shown in FIG. 7, the first track mechanism includes the third rib 1010 arranged on the circuit breaker housing 1, and the switch-on button track groove 101 is arranged in the middle of the third rib 1010 in the length direction of the latter. As shown in FIG. 8, the switch-on button 20 further includes the switch-on button bottom foot 206, which is arranged at one end of the switch-on button transmission portion 203 connected to the switch-on button operating portion 202, and which is positioned together with the switch-on button operating portion 202 at both ends of the switch-on button transmission portion 203, respectively. The switch-off button track bar 205 is positioned between the switch-on button operating portion 202 and the switch-on button connecting hole 204, and connected to the latter two, respectively. The switch-on button operating end is slidably arranged in the switch-on button hole 110, and the switch-on button bottom foot 206 is slidably co-operated with the third rib 1010. The switch-on button track protrusion 201 is slidably arranged in the switch-on button track groove 101 to limit the movement path of the switch-on button 20. The switch-off button operating end is slidably arranged in the switch-off button hole 111, and the switch-off button track portion 215 is placed on one side of the switch-on button operating portion 203. The switch-off button track groove 2150 is slidably co-operated with the switch-off button track bar 205 to limit the movement path of the switch-off button.

Preferably, as shown in FIGS. 10-24, the circuit breaker of the present invention further includes the locking mechanism arranged inside the circuit breaker housing 1, and one of the improvements of the present invention lies in the locking design of the locking mechanism.

As shown in FIGS. 10-17, the locking mechanism includes the first locking member **1*a* with one end protruding outside the circuit breaker housing 1, which includes the locking member opening 17 co-operated with the first locking member 1*a*, one end of which extends to the outside of the circuit breaker housing 1 through the locking member opening 17. When the circuit breaker is in the switch-off state, the first locking member 1*a* can retract into the inside of the circuit breaker housing 1 under the function of an external force for retraction. For example, while the circuit breaker is being installed to the assembling position of the circuit breaker, the assembling position housing of the circuit breaker squeezes the first locking member 1*a* to enable it move toward the inside of the circuit breaker housing 1 (assembling position housing applies an external force for retraction on the first locking member 1*a*) during the assembling process, and enables the first locking member 1*a* to be co-operated with the switch-on button 20 and/or the switch-off button 21 in a position-limit way, locking the switch-on button 20 and/or the switch-off button 21, so as to prevent the circuit breaker from switching on. After the circuit breaker has been assembled to the designated position, the locking member opening 17 corresponds to the assembling limiting hole of the assembling position housing, so the first locking member 1*a* protrudes outside the circuit breaker housing 1 from the locking member opening 17 again and releases its position-limiting co-operation with the switch-on button 20 and/or the switch-off button 21. Unlocking the button mechanism 2 and co-operating the first locking member 1*a* with the assembling limiting hole of the assembling position housing in a position-limit way enable the circuit breaker to normally switch on and switch off through the switch-on button 20 and/or the switch-off button 21**, and prevent the circuit breaker from being pulled out from its assembling position at will.

Further, as shown in FIGS. 14-17, the switch-on button 20 and/or the switch-off button 21 includes the button limiting groove 216 in the position-limiting co-operation with the first locking member **1*a*, and the first locking member 1*a* includes the first locking member limiting protrusion 14*a* fitted with the button limiting groove 216. When the circuit breaker is in the switch-on state, the button limiting groove 216 is misaligned with the first locking member limiting protrusion 14*a*, and the switch-on button 20 and/or the switch-off button 21 prevent the first locking member 1*a* from moving toward the inside of the circuit breaker housing 1. When the circuit breaker is in the switch-off state, the button limiting groove 216 is arranged opposite to the first locking member limiting protrusion 14*a*, and the first locking member 1*a* can move toward the inside of the circuit breaker housing 1, enabling the first locking member limiting protrusion 14*a* to slide into the button limiting groove 216**.

Preferably, as shown in FIGS. 10-15, the switch-on button 20 and the switch-off button 21 are parallelly arranged and slidably and linearly installed inside the circuit breaker housing 1. The first locking member **1*a* is movably and linearly installed inside the housing 6, and the movement directions of the switch-on button 20 and the switch-off button 21 are perpendicular to the movement direction of the first locking member 1*a*. Further, as shown in FIGS. 10-15, the locking mechanism further includes the first resetting spring 5*a* arranged between the circuit breaker housing 1 and the first locking member 1*a*, and the first resetting spring 5*a* applies a force on the first locking member 1*a*, so as to enable one end of the first locking member 1*a* to protrude outside the circuit breaker housing 1 without interference from other external forces. When the circuit breaker is in the switch-off state, the first locking member 1*a* can retract into the circuit breaker housing 1** under the function of an external force for retraction.

Figure 14:
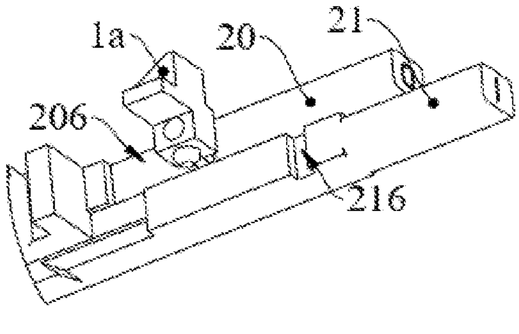
FIG. 14 is a schematic diagram showing the cooperation of the first locking member and the button mechanism of the present invention, where the circuit breaker is in the switch-on state, and the switch-off button prevents the first locking member from moving toward the inside of the circuit breaker housing.
Figure 15:
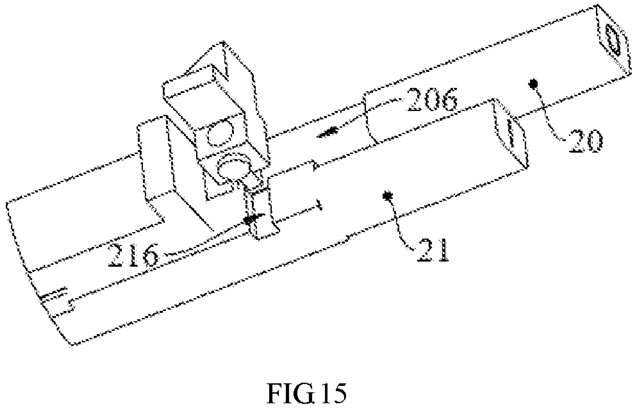
FIG. 15 is a schematic diagram showing the cooperation of the first locking member and the button mechanism of the present invention, where the circuit breaker is in the switch-off state, the button limiting groove of the switch-off button is opposite to the first locking member limiting protrusion, and the first locking member can move toward the inside of the circuit breaker housing.

Specifically, as shown in FIGS. 14 and 15, the switch-on button 20 and the switch-off button 21 can move left and right, as well as in the direction opposite to each other, synchronously, and the first locking member **1*a* can move up and down. As shown in FIG. 14, the circuit breaker is in the switch-on state, the button limiting groove 216 of the switch-off button 21 is misaligned with first locking member limiting protrusion 14*a* of the first locking member 1*a*, so that the first locking member 1*a* cannot move down. As shown in FIG. 15, the circuit breaker is in the switch-off state, the button limiting groove 216 of the switch-off button 21 is arranged opposite to the first locking member limiting protrusion 14*a* of the first locking member 1*a*, so that the first locking member 1*a* can move down, enabling the first locking member limiting protrusion 14*a* to slide into the button limiting groove, thereby limiting the left and right movements of the switch-on button 20 and the switch-off button 21. It should be pointed out that the button limiting groove 216 may also be arranged on the switch-on button 20, only in the case that the button limiting groove 216 is misaligned with the first locking member limiting protrusion 14*a* in the switch-on state of circuit breaker and the button limiting groove 216 is arranged opposite to the first locking member limiting protrusion 14*a*** in the switch-off state of circuit breaker.

Further, as shown in FIGS. 14-15, the switch-on button 20 and the switch-off button 21 are parallelly arranged, and the switch-on button 20 and the first locking member **1*a* both are positioned above the switch-off button 21, that is, the switch-on button 20 and the first locking member 1***a* are both positioned between the switch-off button 21 and the locking member opening 17. The first locking member 1*a* is positioned at one side of the switch-on button 20, and the switch-off button 21 includes the button limiting groove 216 co-operated with the first locking member 1*a* at a limited position. The first locking member 1*a* includes the first locking member limiting protrusion 14*a* fitted with the button limiting groove 216, and the switch-on button 20 is provided with the switch-on button avoiding groove 206 used to avoid the first locking member limiting protrusion 14*a* of the first locking member 1*a*. When one end of the first locking member 1*a* protrudes outside the circuit breaker housing 1, the first locking member limiting protrusion 14*a* is positioned in the switch-on button avoiding groove 206, the width of which in the movement direction of the switch-on button 20 is much larger than the width of the first locking member limiting protrusion 14*a*, so the switch-on button 20 will not come into contact with the first locking member limiting protrusion 14*a* during its switch-on and switch-off movement, enabling the switch-on button 20 and the switch-off button 21 to move, so as to drive the circuit breaker to switch on and switch off. When the circuit breaker is in the switch-on state, the button limiting groove 216 is misaligned with the first locking member limiting protrusion 14*a*, and the first locking member limiting protrusion 14*a* is positioned in the switch-on button avoiding groove 206, so the switch-off button 21 prevents the first locking member 1*a* from moving toward the inside of the circuit breaker housing 1. When the circuit breaker is in the switch-off state, the button limiting groove 216 is arranged opposite to the first locking member limiting protrusion 14*a*, so the first locking member 1*a* can move toward the inside of the circuit breaker housing 1 under an external force of retraction, enabling the first locking member limiting protrusion 14*a* to slide into the button limiting groove 216.

In this preferred example, the switch-on button 20 and the first locking member 1*a* are arranged on the same plane, and both positioned above the switch-off button 21, so this solution makes the structure more compact. The switch-on button 20 is provided with the switch-on button avoiding groove 206 used to avoid the first locking member limiting protrusion 14*a* of the first locking member 1*a*, enabling the movement of the switch-on button 20 not to be interfered during its switch-on or switch-off operation. Moreover, the first locking member 1*a* can also abut against the switch-off button 21, shortening the distance that the first locking member 1*a* needs to move for the unlocking and locking co-operation. The first locking member limiting protrusion 14*a* corresponds to the button limiting groove 216 of the switch-off button 21 during switch-off operation, so the first locking member 1*a* can retract into the circuit breaker housing 1. The first locking member limiting protrusion 14*a* is misaligned with the button limiting groove 216 of the switch-off button 21 during switch-on operation, and the first locking member limiting protrusion 14*a* is limited by the switch-off button 21 in a position-limit way, so that the first locking member 1*a* cannot be pressed into the circuit breaker housing 1, neither pulled out of the assembling position of the circuit breaker in the switch-on state.

Preferably, as shown in FIGS. 10-13 and 18, the circuit breaker of the present invention further includes an unlocking mechanism drivingly connected to the first locking member 1*a*. When the circuit breaker is in the switch-off state, operating the unlocking mechanism enables the first locking member 1*a* to move toward the inside of the circuit breaker housing 1, and retract into the inside of the circuit breaker housing 1, releasing its position-limiting co-operation with the assembling position housing and making its position-limiting co-operation with the button mechanism 2. When the circuit breaker is in the switch-on state, the switch-on button 20 and/or the switch-off button 21 prevents the first locking member 1*a* from moving toward the inside of the circuit breaker housing 1, ensuring that the first locking member 1*a* cannot be unlocked when the circuit breaker is in switch-on state, ensuring electrical safety.

Further, as shown in FIGS. 10-13, the unlocking mechanism includes the independent pulling member 2*a* drivingly co-operated with the first locking member 1*a*. When the circuit breaker is in the switch-off state, pulling the pulling member 2*a* enables the first locking member 1*a* to move towards the inside of the circuit breaker housing 1, so as to release the position-limiting co-operation of the first locking member 1*a* with the assembling position housing. Further, as shown in FIGS. 10-13, the unlocking mechanism further includes the linkage member 3*a* and the lever support 4*a* arranged on the circuit breaker housing 1. Of the linkage member 3*a*, one end is drivingly connected with the first locking member 1*a*, the other end is drivingly co-operated with the pulling member 2*a*, and the middle part is contacting co-operated with the lever support 4*a*. Pulling the pulling member 2*a* enables the linkage member 3*a* to rotate around the lever support 4*a*, and the linkage member 3*a* drives the first locking member 1*a* to move towards the inside of the circuit breaker housing 1 and release its position-limiting co-operation with the assembling position housing. As another example, the unlocking mechanism may not be provided with the lever support 4*a*, but the linkage member 3*a* may be rotationally installed inside the circuit breaker housing 1 through the couple between the waist-shaped hole arranged on the linkage member 3*a* and the linkage member shaft fixed on the circuit breaker housing 1. Of the linkage member 3*a*, one end is co-operated with the first locking member 1*a*, and the other end is co-operated with the pulling member 2*a*. Pulling the pulling member 2*a* enables the linkage member 3*a* to rotate, and the other end of the linkage member 3*a* to act on the first locking member 1*a*, so that the first locking member 1*a* retracts into the circuit breaker housing 1.

Compared with the existing circuit breaker which releases the position-limiting co-operation with the assembling position housing by pulling the button, the present invention has yet another improvement in that the circuit breaker is independently provided with the pulling member 2*a* of the unlocking mechanism, instead of unlocking the first locking member through the button mechanism, thereby avoiding the circuit breaker from being mistakenly pulled out by pulling the button. It should be pointed out that the independent pulling member 2*a* of the present invention is not only applicable to the solution of the switch-on button 20 and the switch-off button 21 of the present invention, but also can be used in the case that one button achieves the switch-on and switch-off operation.

It should be pointed out that, as an alternative embodiment, the first locking member 1*a* may not be provided with the first locking member limiting protrusion 14*a*, then regardless of whether the circuit breaker is in switches on or switches off state, the pulling member 2*a* can drive the first locking member 1*a* to move toward the inside of the circuit breaker housing 1.

Figure 17:
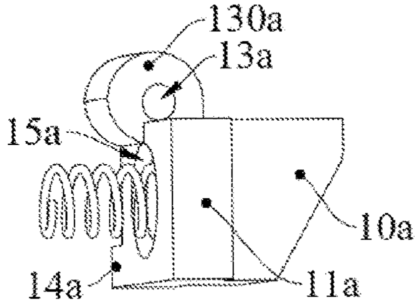
FIG. 17 is a structure diagram of the second embodiment of the first locking member of the present invention.

Preferably, as shown in FIG. 17, the first embodiment of the first locking member 1*a* is provided.

As shown in FIG. 17, the first locking member 1*a* includes the first locking member main body 10*a*, the first locking member sheltering protrusion 11*a*, the first locking member limiting protrusion 14*a* and the locking member's spring limiting structure 15*a*. The first locking member sheltering protrusion 11*a* and the first locking member limiting protrusion 14*a* are respectively arranged on both sides of the first locking member main body 10*a*. The locking member's spring limiting structure 15*a* is arranged on the side of the first locking member main body 10*a* far away from the locking member opening 17. Of the first locking member main body 10*a*, one end protrudes outside the circuit breaker housing 1 through the locking member opening 17 arranged on the circuit breaker housing 1, and the other end is connected to the first resetting spring 5*a* through the locking member's spring limiting structure 15*a*. Of the first resetting spring 5*a*, one end is co-operated with the locking member limiting structure 15*a* in a position-limit way, and the other end is co-operated with the circuit breaker housing 1 in a position-limit way. The first locking member sheltering protrusion 11*a* is co-operated with the circuit breaker housing 1 in a position-limit way to prevent the first locking member sheltering protrusion 11*a* from separating itself from the locking member opening 17. Further, as shown in FIG. 17, the first locking member 1*a* further includes the first locking member activated portion 130*a* connected with the linkage member 3*a* of the unlocking mechanism. The first locking member connecting hole 13*a* is arranged in the middle of the first locking member activated portion 130*a*, into which one end of the linkage member 3*a* is inserted. The first locking member activated portion 130*a* is arranged on one side of the first locking member main body 10*a* and between the first locking member main body 10*a* and the lever support 4*a*. Further, as shown in FIG. 17, the locking member's spring limiting structure 15*a* is a spring limiting groove.

Figure 16:
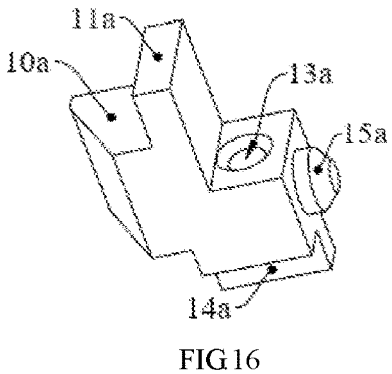
FIG. 16 is a structure diagram of the first embodiment of the first locking member of the present invention.

Preferably, as shown in FIG. 16, the second embodiment of the first locking member 1*a* is provided.

As shown in FIG. 16, the first locking member 1*a* of this example is different from that of the first embodiment in that no first locking member activated portion 130*a* protrudes, instead of that one end of the first locking member main body 10*a* protrudes outside the circuit breaker housing 1, and one side of the other end is provided with the first locking member connecting hole 13*a* as the first locking member activated portion 130*a*. Further, as shown in FIG. 17, the locking member's spring limiting structure 15 is a spring limiting protrusion. Obviously, the first locking member 1*a* can also be configured to be other similar structures as required.

Preferably, as shown in FIGS. 10, 11A, 11B, and 18, multiple embodiments of the pulling member 2*a* are provided.

The pulling member 2*a* includes the pulling member operating portion 20*a*, the pulling member's first transition portion 21*a* and the pulling member driving portion 24*a*. The pulling member operating portion 20*a* is vertically connected with the pulling member's first transition portion 21*a*, and the pulling member driving portion 24*a* is obliquely connected to the pulling member's first transition portion 21*a*. The pulling member operating portion 20*a* constitutes an operating portion that eases pulling by hands or tools. The pulling member's first transition portion 21*a* is parallel to the movement direction of the pulling member 2*a*, constituting a sliding support, and the pulling member driving portion 24*a* is inclined, so as to actuate the linkage member 3*a* to drive the first locking member 1*a* to retract into the inside of the circuit breaker housing 1. In an embodiment, the pulling member 2*a* only includes the pulling member operating portion 20*a*, the pulling member's first transition portion 21*a* and the pulling member driving portion 24*a*. Thus, the pulling member 2*a* constitutes an approximate Z-shaped structure or a U-shaped structure. The Z-shaped structure occupies a relatively large space, but the U-shaped structure has relatively poor stability of the sliding fit with the locking mechanism.

Figure 11A:
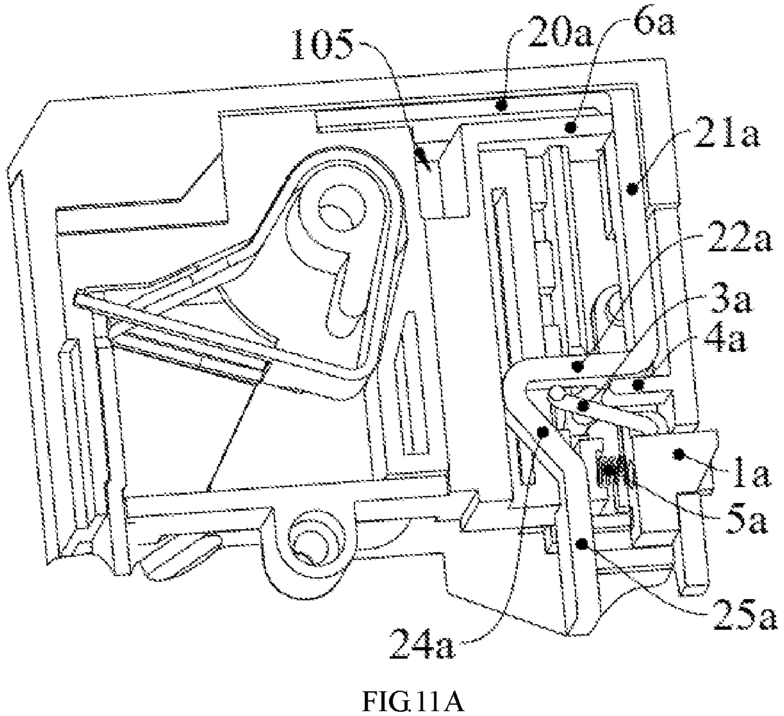
FIG. 11A is an assembly structure diagram of the pulling member and the first locking member of the present invention, where the pulling member maintaining magnet arranged on the circuit breaker housing is magnetically co-operated with the pulling member operating portion of the pulling member.

Further, in a preferred embodiment, as shown in FIG. 11A, the pulling member 2*a* also includes the pulling member's second transition portion 22*a* connected between the pulling member's first transition part 21*a* and the pulling member driving portion 24*a*. The pulling member's second transition portion 22*a* is parallel to the pulling member operating portion 20*a* and perpendicular to the pulling member's first transition part 21*a*. The pulling member's second transition portion 22*a* and the pulling member operating portion 20*a* are both positioned at one side of the pulling member's first transition part 21*a* to form a U-shape. The space occupied by the pulling member 2*a* can be reduced by bending, and the pulling member's second transition portion 22*a* can be used to pull the circuit breaker out and limit the position of the pulling member 2*a*. The pulling member driving portion 24*a* extends in the direction far away from the pulling member operating portion 20*a* and inclined and bent near one side of the pulling member's first transition part 21*a*.

Figure 11B:
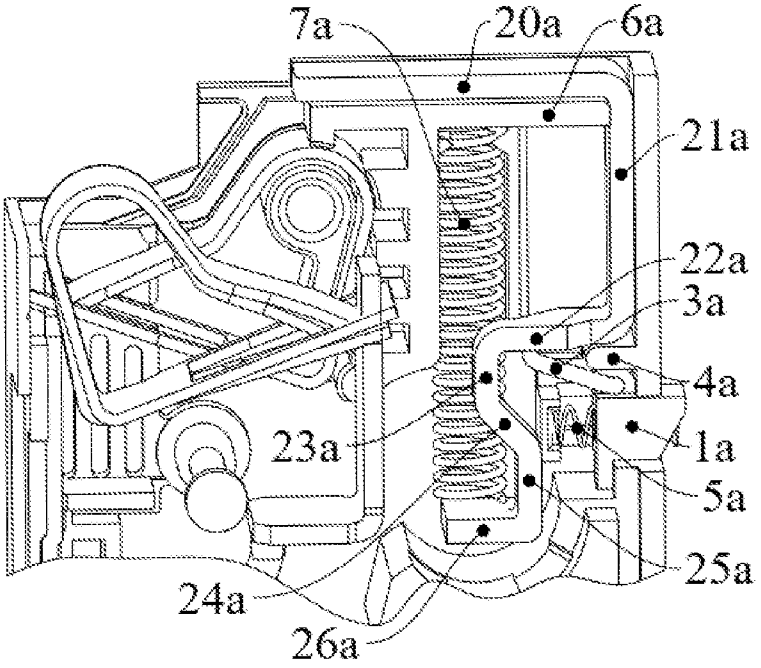
FIG. 11B is an assembly structure diagram of the pulling member and the first locking member of the present invention, where the pulling member resetting spring is arranged between the pulling member' spring limiting portion and the pulling member limiting rib of the pulling member.

Further, in a preferred embodiment, as shown in FIG. 11B, the pulling member 2*a* also includes: the pulling member's third transition portion 23*a* connected between the pulling member's second transition part 22*a* and the pulling member driving portion 24*a*, parallel to the pulling member's first transition part 21*a*, and used to balance the sliding of the pulling member 2*a* and adjust the position of the pulling member driving portion 24*a*; or/and the pulling member 2*a* further includes a pulling member maintaining portion 25*a* connected to the pulling member driving portion 24*a* and parallel to the pulling member's first transition portion 21*a*. The inclined pulling member driving portion 24*a* gradually actuates the linkage member 3*a* to drive the first locking member 1*a* to retract into the circuit breaker housing 1, thus the pulling member maintaining portion 25*a* enables the first locking member 1*a* to remain at the retraction position by means of the linkage member 3*a*.

Figure 18:
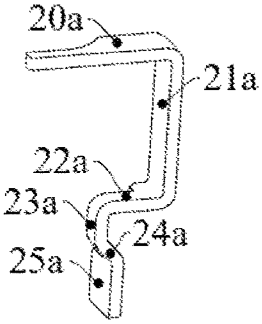
FIG. 18 is a structure diagram of the pulling member of the present invention.

As shown in FIG. 18, a preferred embodiment of the pulling member 2*a* is provided. The pulling member 2*a* includes the pulling member operating portion 20*a*, the pulling member's first transition portion 21*a*, the pulling member's second transition portion 22*a*, the pulling member's third transition part 23*a*, the pulling member driving portion 24*a* and the pulling member maintaining portion 25*a*, which are sequentially connected. The pulling member operating portion 20*a* is parallel to the pulling member's second transition portion 22*a*. The pulling member's first transition portion 21*a* and the pulling member's third transition part 23*a* are parallel to the pulling member maintaining portion 25*a*, and perpendicular to the pulling member operating portion 20*a*. The pulling member driving portion 24*a* is inclined, and has the end crookedly connected with the pulling member's third transition part 23*a* as the first end of the driving portion, and the end crookedly connected with the pulling member maintaining portion 25*a* as the second end of the driving portion. The first end of the driving portion is far away from the first locking member 1*a* relative to the second end of the driving portion. Further, the pulling member 2*a* is integrally formed by stamping and bending a metal material.

Preferably, as shown in FIGS. 10-13, the circuit breaker housing 1 further includes the pulling member limiting rib 6*a* arranged between the pulling member operating portion 20*a* and the pulling member's second transition portion 22*a*. After pulling the pulling member 2*a* has driven the first locking member 1*a* to retract into the circuit breaker housing 1 and release its position-limiting co-operation with the assembling position housing, continuously pulling the pulling member 2*a* enables it to be co-operated with the pulling member limiting rib 6*a* in a position-limit way, thus pull out the circuit breaker from the assembling position of the circuit breaker.

Figure 10:
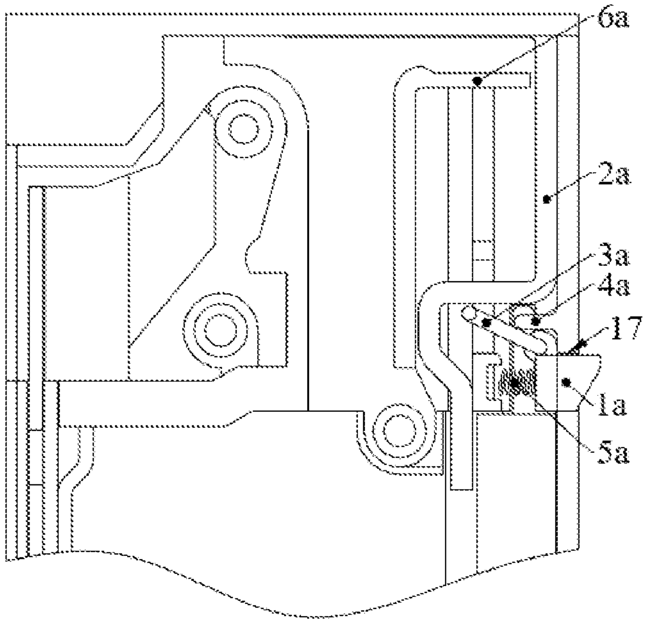
FIG. 10 is an assembly structure diagram of the pulling member and the first locking member of the present invention.
Figure 12:
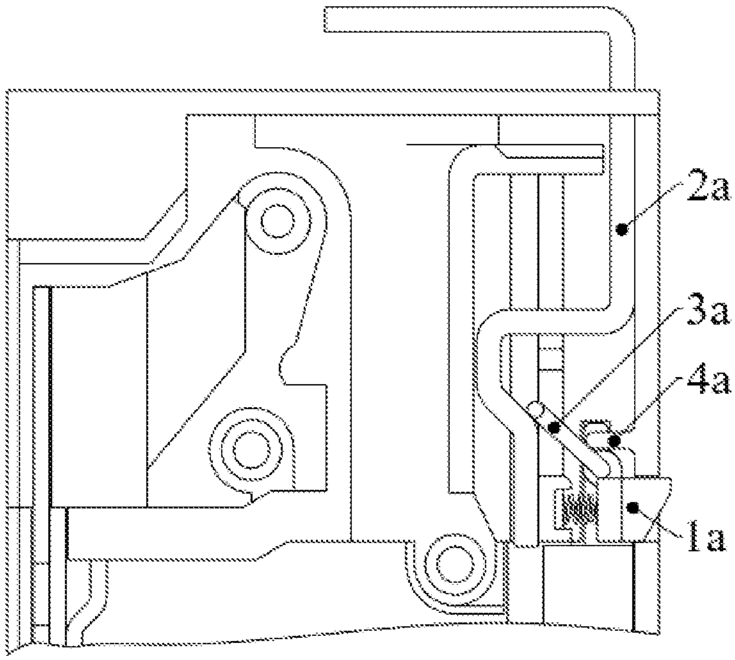
FIG. 12 is an assembly structure diagram of the pulling member and the first locking member of the present invention, where the pulling member driving portion drives the first locking member to move toward the inside of the circuit breaker housing through the linkage member.
Figure 13:
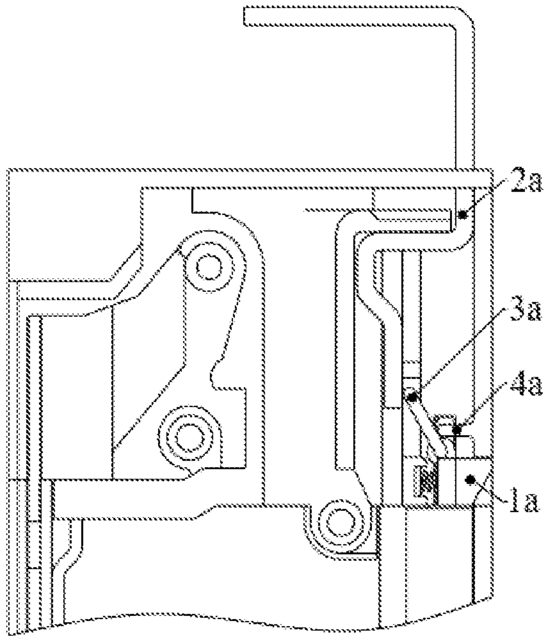
FIG. 13 is an assembly structure diagram of the pulling member and the first locking member of the present invention, where the first locking member has completely moved into the circuit breaker housing, so that continuing to pull the pulling member enables the circuit breaker to be pulled out from the assembling position of the circuit breaker.

Specifically, as shown in FIGS. 10, 11A and 11B, of the first locking member 1*a*, the right end protrudes outside the circuit breaker housing 1, and the left end is connected with the right end of the linkage member 3*a* and with the circuit breaker housing 1 through the first resetting spring 5*a*. Of the linkage member 3*a*, the middle part is contacting co-operated with the lever support 4*a* arranged above the first locking member 1*a*, and the left end is drivingly co-operated with the pulling member driving portion 24*a*. The upper end and the lower end of the pulling member driving portion 24*a* are the first end of the driving portion and the second end of the driving portion, respectively. When the circuit breaker is in the switch-off state, the pulling member 2*a* is being pulled upwards until the pulling member driving portion 24*a* touches the left end of the linkage member 3*a* (as shown in FIG. 12). As shown in FIG. 13, continuing to pull the pulling member 2*a* enables the linkage member 3*a* to rotate clockwise around the lever support 4*a*, then the right end of the linkage member 3*a* drives the first locking member 1*a* to move to the left, and the right end of the first locking member 1*a* to completely retract into the circuit breaker housing 1 and to be co-operated with the button mechanism 2 in a position-limit way, so as to release the first locking member 1*a* from its position-limiting co-operation with the assembling position housing, and enable the pulling member maintaining portion 25*a* to be co-operated with the left end of the linkage member 3*a* in a position-limit way, so that the first locking member 1*a* is kept inside the circuit breaker housing 1.

Preferably, as shown in FIG. 11A, the pulling member 2*a* is made of metal magnetic material. The unlocking mechanism also includes the pulling member maintaining magnet arranged in the circuit breaker housing 1 and co-operated with the pulling member operating portion 20*a*. The pulling member maintaining magnet is installed in the groove 105 on the circuit breaker housing 1, and magnetically co-operated with the pulling member operating portion 20*a*. The pulling member maintaining magnet can reliably hold the pulling member operating portion 20 inside the circuit breaker housing, keep the appearance of the circuit breaker clean and tidy at unnecessariness of operating the pulling member 2*a*, and avoid the pulling member 2*a* from undesiredly protruding from the circuit breaker housing, and causing misoperation or damage to the pulling member 2*a*. Further, when the pulling member 2*a* is operated to be pulled out to the designated position, the pulling member's second transition portion 22*a* can also keep its magnetical co-operation with the pulling member maintaining magnet, so that the pulling member can be kept at the pulled-out position outside the circuit breaker housing 1.

It should be pointed out that the "magnetic co-operation" refers to the pulling member operating portion 20*a* being absorbed by the pulling member maintaining magnet. The content as said before as "the pulling member 2*a* is made of metallic magnetic material" means that the pulling member operating portion 20*a* can be magnetically absorbed by the pulling member maintaining magnet, but it does not have to be a magnet.

Preferably, as shown in FIGS. 1, 19, 20 and 25, the circuit breaker housing 1 further includes the wire-outlet hole 112 and the pulling member operating hole 113. The wire-outlet hole 112, the pulling member operating hole 113, the switch-on button hole 110 and the switch-off button hole 111 are positioned on the same side wall of the circuit breaker housing 1. The circuit breaker housing 1 also includes the pulling member' dig slot 16. The pulling member operating portion 20*a* of the pulling member 2*a* is arranged inside the pulling member operating hole 113, enabling the pulling member 2*a* not to protrude out of the circuit breaker housing 1 during no pulling out. The pulling member' dig slot 16 communicates with the pulling member operating hole 113, and the pulling operation is performed by means of the pulling member' dig slot 16.

Further, as a preferred solution, the pulling member' dig slot 16 is arranged between the wire-outlet hole 112 and the pulling member operating hole 113 and sheltered by the outlet-wire, and the two ends of the pulling member' dig slot 16 communicates with the wire-outlet hole 112 and the pulling member operating hole 113, respectively. Thus, only after the outlet wire is removed, the pulling member operating portion 20*a* can be dug out from the pulling member operating hole 113 at the pulling member' dig slot 16. Alternatively, as another preferred solution, the pulling member' dig slot 16 is arranged between the switch-off button hole 111 and the pulling member operating hole 113. Thus, when the circuit breaker is in the switch-on state, the switch-off button 21 shelters the pulling member' dig slot 16; when the circuit breaker is in the switch-off state, only if the switch-off button 21 moves toward the inside of the circuit breaker housing 1 and leaves off the pulling member' dig slot 16, the pulling member operating portion 20*a* can be dug out from the pulling member operating hole 113 at the pulling member' dig slot 16. When the outlet wire is removed, the pulling member can be pulled out only if the circuit breaker is in the switch-off state. The arrangement of the above structure ensures that only when the circuit breaker is in the switch-off state, the unlocking mechanism can unlock the position-limiting cooperation between the first locking member 1*a* and the assembling position housing, avoiding the pulling member 2*a* from being damaged and the circuit breaker from being pulled out with electricity during pulling the pulling member 2*a* in the switch-on state and ensuring the electrical safety for users.

Preferably, as shown in FIG. 11B, in another embodiment of the pulling member, the pulling member 2*a* further includes the pulling member's spring limiting portion 26*a*. The pulling member's spring limiting portion 26*a* and the pulling member operating portion 20*a* are parallel to each other and positioned at both ends of the pulling member 2*a*, respectively. The unlocking mechanism further includes the pulling member resetting spring 7*a* arranged between the pulling member's spring limiting portion 26*a* and the pulling member limiting rib 6*a*. The pulling member resetting spring 7*a* can reliably keep the pulling member operating portion 20*a* of the pulling member 2*a* inside the circuit breaker housing. The pulling member's spring limiting portion 26*a* is crookedly connected to the pulling member maintaining portion 25*a*, or directly crookedly connected to the pulling member driving portion 24*a*.

Further, as shown in FIGS. 10-13, the pulling member 2*a* is stacked with the switch-on button 20 and the switch-off button 21 in the thickness direction of the circuit breaker to save space. The movement direction of the pulling member 2*a* is parallel to the movement direction of the switch-on button 20 and the switch-off button 21, and perpendicular to the movement direction of the first locking member 1*a*, which moves in the width direction of the circuit breaker. The first transition portion 21*a* of the pulling member 2*a* abuts against the side wall on which the locking member opening 17 arranged of the circuit breaker housing 1 and moves along the side wall, and the first transition portion 21*a* is limited to slide between the pulling member limiting rib 6*a* and the lever support 4*a* in the movement direction, and restricted by one end of the pulling member limiting rib 6*a* and the circuit breaker housing 1 in the direction perpendicular to the movement direction. The first transition portion 21*a* and the first locking member 1*a* are arranged on both sides of the lever support 4*a*, respectively, and the linkage member 3*a* is positioned between the first locking member 1*a* and the lever support 4*a*. The pulling member 2*a*, the linkage member 3*a* and the first locking member 1*a* are all arranged on the switch-on button 20 and the switch-off button 21 in overlap in the thickness direction of the circuit breaker and positioned above the switch-on button 20 and the switch-off button 21. The first locking member limiting protrusion 14*a* of the first locking member 1*a* protrudes and extends into the switch-on button avoiding groove 206 of the switch-on button 20.

Preferably, the linkage member 3*a* is a Z or U-shaped pulling rod, one end of which is inserted on the first locking member 1*a*, and the other end of which extends in the sliding direction of the pulling member driving portion 24*a* of the pulling member 2*a*. The linkage member 3*a* drives the first locking member 1*a* to retract into the circuit breaker housing 1 by means of the lever support 4*a* as a rotational support. Its installation structure is quite simple, and the lever support 4*a* simultaneously performs the function of restricting the first locking member 1*a* and supporting the linkage member 3*a*.

Preferably, as shown in FIGS. 21-24, the locking mechanism further includes the second locking member 1*b*.

As shown in FIGS. 21-24, the second locking member 1*b* is pivotally arranged on the circuit breaker housing 1, including the second locking end 13*b*. When the circuit breaker switches on, the switch-on button 20 or the switch-off button 21 drives the second locking member 1*b* to rotate (rotate in the second direction), enabling the second locking end 13*b* to protrude outside the circuit breaker housing 1. When the circuit breaker switches off, the switch-on button 20 or the switch-off button 21 drives the second locking member 1*b* to rotate (rotate in the first direction), enabling the second locking end 13*b* to retract into the circuit breaker housing 1.

Figure 23:
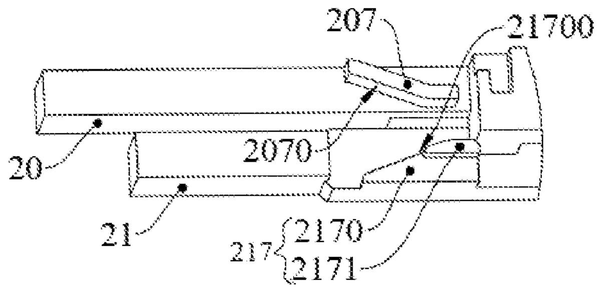
FIG. 23 is a structure diagram of the switch-on button and the switch-off button of the present invention, showing the structure of the switch-on button driving portion and the switch-off button driving portion.

Further, as a solution shown in FIGS. 22-24, the switch-on button 20 includes the switch-on button driving part 207 drivingly co-operated with the second locking member 1*b*, and the switch-off button 21 includes the switch-off button driving portion 217 drivingly co-operated with the second locking member 1*b*. As shown in FIG. 24, when the circuit breaker switches on, the switch-off button 21 driving the second locking member 1*b* to rotate through the switch-off button driving portion 217 enables the second locking end 13*b* to protrude outside the circuit breaker housing 1, and the switch-off button driving portion 217 withstanding the second locking end 13*b* enables the second locking end 13*b* not to retract into the circuit breaker housing 1. As shown in FIG. 22, when the circuit breaker switches off, the switch-on button 20 driving the second locking member 1*b* to rotate through the switch-on button driving portion 207 enables the second locking end 13*b* to retract into the circuit breaker housing 1, and the switch-on button driving portion 207 restricting the second locking end 13*b* enables the second locking end 13*b* to be kept inside the circuit breaker housing 1. Specifically, in the directions shown in FIG. 24, when the circuit breaker switches on, the switch-off button 21 drives the second locking member 1*b* to rotate counterclockwise (rotate in the second direction), so that the second locking end 13*b* protrudes outside the circuit breaker housing 1; as shown in FIG. 22, when the circuit breaker switches off, the switch-on button 20 drives the second locking member 1*b* to rotate clockwise (rotate in the first direction), so that the second locking end 13*b* retracts into the circuit breaker housing 1.

Preferably, as shown in FIGS. 22-24, the second locking member 1*b* includes the second locking member mounting portion 10*b* pivotally connected to the circuit breaker housing 1, the locking member's first activated portion 11*b* drivingly co-operated with the switch-off button 21, the locking member's second activated portion 12*b* drivingly co-operated with the switch-on button 20 and the second locking end 13*b*. When the circuit breaker switches on, the switch-off button 21 driving the second locking member 1*b* to rotate through the locking member's first activated portion 11*b* enables the second locking end 13*b* to protrude outside the circuit breaker housing 1; when the circuit breaker switches off, the switch-on button 20 driving the second locking member 1*b* to rotate through the locking member's second activated portion 12*b* enables the second locking end 13*b* to retract into the circuit breaker housing 1. In this example, the first activated portion 11*b* and the second locking end 13*b* are two cooperating ends; in another example, the second locking end 13*b* and the second locking end 13*b* may also be the one cooperating end. Further, as shown in FIGS. 22 and 24, the locking member's first activated portion 11*b* includes the locking member's first activated protrusion 110*b* protruding toward one side of the switch-off button 21, and the locking member's second activated portion 12*b* includes the locking member's second activated protrusion 120*b* protruding toward one side of the switch-on button 20. The locking member's first activated protrusion 110*b* and the locking member's second activated protrusion 120*b* are positioned at the same side of the second locking member 1*b*. When the circuit breaker switches on, one side of the switch-off button driving portion 217 driving the second locking member 1*b* to rotate through the locking member's first activated protrusion 110*b* enables the second locking end 13*b* to protrude outside the circuit breaker housing 1; when the circuit breaker switches off, one side of the switch-on button driving portion 207 driving the second locking member 1*b* to rotate through the locking member's second activated protrusion 120*b* enables the second locking end 13*b* to retract into the circuit breaker housing 1.

Further, as shown in FIGS. 22-24, the switch-on button driving portion 207 includes the switch-on button driving bevel 2070 drivingly co-operated with the locking member's second activated protrusion 120*b*, and the switch-off button driving portion 217 includes the switch-off button driving bevel 21700 drivingly co-operated with the locking member's first activated protrusion 110*b*. The tilt direction of the switch-on button driving bevel 2070 is opposite to that of the switch-off button driving bevel 21700. The locking member's first activated protrusion 110*b* and the locking member's second activated protrusion 120*b* are positioned between the switch-off button driving bevel 21700 and the switch-on button driving bevel 2070.

When pressing the switch-on button 20 enables the circuit breaker to switch on, the switch-on button driving bevel 2070 moves toward the inside of the circuit breaker housing 1 along with the switch-on button 20 to leave off the second locking member 1*b*, meanwhile, the switch-off button driving bevel 21700 moves toward the outside of the circuit breaker housing 1 along with the switch-off button 21. The switch-off button driving bevel 21700 driving the second locking member 1*b* to rotate through the locking member's first activated protrusion 110*b* enables the second locking end 13*b* to protrude outside the circuit breaker housing 1, and the switch-off button driving bevel 21700 withstanding the locking member's first activated protrusion 110*b* enables the second locking member 1*b* not to retract into the circuit breaker housing 1.

When pressing the switch-off button 21 enables the circuit breaker to switch off, the switch-off button driving bevel 21700 moves toward the inside of the circuit breaker housing 1 along with the switch-off button 21 to leave off the second locking member 1*b*, meanwhile, the switch-on button driving bevel 2070 moves toward the outside of the circuit breaker housing 1 along with the switch-on button 20. The switch-on button driving bevel 2070 pressing down the locking member's second activated protrusion 120*b* enables the second locking end 13*b* to retract into the circuit breaker housing 1, and the switch-on button driving bevel 2070 restricting the second locking member 1*b* enables the latter to be kept inside the circuit breaker housing 1. Further, as shown in FIGS. 22 and 23, the switch-on button driving bevel 2070 is formed by the switch-on button driving protrusion arranged on the switch-on button 20. The switch-off button driving bevel 21700 is formed by the switch-off button driving protrusion groove arranged on the switch-off button 21. When the circuit breaker is in the switch-off state, the switch-on button driving bevel 2070 and the switch-off button driving bevel 21700 form a funnel-shaped structure.

Preferably, as shown in FIGS. 22-24, the switch-off button driving portion 217 includes the switch-off button driving portion's first step 2170 arranged on one side of the switch-off button 21, and the switch-off button driving portion's second step 2171 arranged on one side of the switch-off button driving portion's first step 2170 far away from the switch-off button 21. The switch-off button driving portion's first step 2170 is shaped as a triangular structure in its entirety, and the switch-off button driving portion's second step 2171 is arranged at a vertex angle of the triangular structure close to the switch-on button 20.

Further, as shown in FIGS. 22 and 24, the second locking member 11*b* is shaped as an approximately H-shaped structure, and the second locking member mounting portion 10*b* and the locking member's first activated portion 11*b* are positioned at one end of the second locking member 1*b*, forming one transverse bar of the H-shaped structure, and the locking member's second activated portion 12*b* and the second locking end 13*b* are positioned at the other end of the second locking member 1*b*, forming the other transverse bar of the H-shaped structure.

Further, as shown in FIGS. 3 and 21-24, the second locking member 1*b* is stacked with the switch-on button 20 and the switch-off button 21 in the thickness direction of the circuit breaker to save space. In the thickness direction of the circuit breaker, the second locking member 1*b* is positioned above the switch-on button 20 and the switch-off button 21, and the pulling member 2*a* is positioned above the second locking member 1*b*. The first locking member 1*a* is positioned above the second locking end 13*b* of the second locking member 1*b*, and one end of the first locking member 1*a* and the second locking end 13*b* share a large locking member opening 17, of course, also may share two independent locking member openings. In the movement direction of the switch-on button 20 and the switch-off button 21, the first locking member 1*a* is closer to the inside of the circuit breaker housing 1 than the second locking member 1*b*.

As shown in FIG. 25, an embodiment of the circuit breaker housing 1 is provided.

As shown in FIG. 25, the circuit breaker housing 1 is shaped as a hexahedral structure in its entirety, including the front side wall 1001 and the rear side wall 1002 arranged oppositely, the wire-outlet hole 112, the button holes 110-111 and the pulling member operating hole 113 arranged on the front side wall 1001, and the wire-inlet hole 14 arranged on the rear side wall 1002.

Preferably, as shown in FIG. 25, the button holes 110-111 include the switch-on button hole 110 and the switch-off button hole 111 arranged side by side. Further, the switch-on button operating end of the switch-on button 20 and the switch-off button operating end of the switch-off button 21 are slidingly arranged in the switch-on button hole 110 and the switch-off button hole 111, respectively, and do not protrude out of the front side wall 1001 of the circuit breaker housing 1 all along, thereby avoiding the circuit breaker from switching on/switching off due to users' accidental touch on the switch-on button operating end and the switch-off button operating end, and ensuring the stability and safety of the user's electricity consumption.

Preferably, as shown in FIG. 25, the button holes 110-111 and the pulling member operating hole 113 are arranged at one end of the front side wall 1001, a wire-outlet hole 112 is arranged at the other end of the front side wall 1001, as the first wire-outlet hole, and the other wire-outlet hole 112 is arranged between the first wire-outlet hole and the button holes 110-111, as the second wire-outlet hole. The button holes 110-111 and the second wire-outlet hole are positioned on the same side of the pulling member operating hole 113. Further, as shown in FIG. 19, the circuit breaker housing 1 further includes the pulling member' dig slot 16 arranged on the front side wall 1001. The pulling member' dig slot 16 is arranged between the second wire-outlet hole and the pulling member operating hole 113, and its two ends communicate with the latter two, respectively. The outlet wire inserted in the second wire-outlet hole shelters the pulling member' dig slot 16. Alternatively, as shown in FIG. 20, the pulling member' dig slot 16 is arranged between the switch-off button hole 111 and the pulling member operating hole 113. When the circuit breaker is in the switch-off state, the switch-off button 21 of the circuit breaker shelters the pulling member' dig slot 16.

Preferably, as shown in FIG. 25, the circuit breaker housing 1 further includes wire-removing holes 1120 arranged on the front side wall 1001 and a communication hole 15 arranged on the rear side wall 1002. The wire-removing holes 1120 is matched with the wire-outlet holes 112 one-to-one, and the communication hole 15 is positioned between the two wire-inlet holes 14.

Preferably, as shown in FIG. 25, the circuit breaker housing 1 further includes the third side wall 1003 and the fourth side wall 1004 arranged oppositely, and the fifth side wall 1005 and the sixth side wall 1006 arranged oppositely. The third side wall 1003, the fourth side wall 1004, the fifth side wall 1005 and the sixth side wall 1006 are all positioned between the front side wall 1001 and the rear side wall 1002.

Further, as shown in FIG. 25, one end of the third side wall 1003 close to the front side wall 1001 is provided with the locking member opening 17.

We have made further detailed description of the present invention mentioned above in combination with specific preferred embodiments, but it is not deemed that the specific embodiments of the present invention is only limited to these descriptions. A person skilled in the art can also, without departing from the concept of the present invention, make several simple deductions or substitutions, which all be deemed to fall within the protection scope of the present invention.

What is claimed is:

1. A circuit breaker, comprising a circuit breaker housing, and a button mechanism and an operating mechanism connected with said button mechanism, which are arranged inside said circuit breaker housing respectively; wherein said circuit breaker housing includes a switch-on button hole and a switch-off button hole all arranged thereon, said button mechanism includes a switch-on button and a switch-off button slidably arranged inside said circuit breaker housing, respectively, said switch-on button includes a switch-on button operating end arranged at one end thereof and slidably arranged in said switch-on button hole, said switch-off button includes a switch-off button operating end arranged at one end thereof and slidably arranged in said switch-off button hole; while said switch-on button operating end is being pressed toward the inside of said circuit breaker housing to drive said operating mechanism to enable the circuit breaker to switch on, said switch-off button operating end moves toward the outside of said circuit breaker housing, while said switch-off button operating end is being pressed toward the inside of said circuit breaker housing to drive said operating mechanism to enable the circuit breaker to switch off, said switch-on button operating end moves toward the outside of said circuit breaker housing:

wherein said operating mechanism includes a bar linkage, and a transmission member and a lever mechanism all pivotally arranged inside said circuit breaker housing, said bar linkage includes a switch-on connecting rod, a switch-off connecting rod and a transmission connecting rod; the reverse end of said switch-on button is drivingly connected to said transmission member through said switch-on connecting rod, the reverse end of said switch-off button is drivingly connected to said transmission member through said switch-off connecting rod, said transmission member is drivingly connected with the lever mechanism through said transmission connecting rod, and said lever mechanism is connected with a movable contact of the circuit breaker; when said switch-on button is pressed toward the inside of said circuit breaker housing to enable the circuit breaker to switch on, said switch-on button actuates said transmission member to rotate in a first direction through said switch-on connecting rod, meanwhile, the rotation of said transmission member drives said switch-off button to move toward the outside of said circuit breaker housing through said switch-off connecting rod; when said switch-off button is pressed toward the inside of said circuit breaker housing to enable the circuit breaker to switch off, said switch-off button actuates said transmission member to rotate in a second direction through said switch-off connecting rod, meanwhile, said rotation of said transmission member drives said switch-on button to move toward the outside of said circuit breaker housing through said switch-on connecting rod, said first direction and said second direction are opposite to each other.

2. The circuit breaker according to claim 1, wherein said transmission member includes a transmission member axle hole, a first connection hole, a second connection hole and a third connection hole, said first connection hole, said second connection hole and said third connection hole are positioned at three vertices of a triangle, respectively, and said transmission member axle hole is arranged in the middle of said transmission member; said transmission member is pivotally arranged on said circuit breaker housing through its transmission member axle hole, and said transmission member is connected to said switch-on connecting rod, said switch-off connecting rod and said transmission connecting rod by means of said first connection hole, and said second connection hole and said third connection hole, respectively; said lever mechanism includes a jump buckle, a lock catch and a rotating plate pivotally arranged on said circuit breaker housing, said jumper buckle and said lock catch are locked with each other and pivotally arranged on said rotating plate, respectively, said rotating plate is connected with said movable contact of the circuit breaker, and said transmission member is drivingly connected with said jumper buckle through said transmission connecting rod.

3. The circuit breaker according to claim 1, wherein said circuit breaker includes a first track mechanism and a second track mechanism used to respectively define the movement paths of said switch-on button and said switch-off button.

4. The circuit breaker according to claim 3, wherein said first track mechanism includes a switch-on button track protrusion arranged on said switch-on button and a switch-on button track groove arranged on said circuit breaker housing, said switch-on button track protrusion is slidably arranged in said switch-on button track groove; said second track mechanism includes a switch-off button track groove arranged on said circuit breaker housing, and said switch-off button is slidably arranged in said switch-off button track groove.

5. The circuit breaker according to claim 3, wherein said first track mechanism includes a switch-on button track protrusion arranged on said switch-on and a switch-on button track groove arranged on said circuit breaker housing, and said switch-on button track protrusion is slidably arranged in said switch-on button track groove; said second track mechanism includes a switch-off button track bar arranged on said switch-on button and in the length direction of said switch-on button and a switch-off button track groove arranged on said switch-off button, and said switch-off button track groove is slidably co-operated with said switch-off button track bar.

6. The circuit breaker according to claim 1, wherein said circuit breaker further includes a locking mechanism co-operated with said button mechanism, said locking mechanism includes a first locking member with one end protruding outside said circuit breaker housing, said circuit breaker housing includes a locking member opening co-operated with said first locking member; when the circuit breaker is in the switch-off state, one end of said first locking member extends outside said circuit breaker housing from said locking member opening, said first locking member can retract into the inside of said circuit breaker housing under the affection of an external force for retraction; when the circuit breaker is in the switch-on state, said first locking member protrudes outside the circuit breaker housing, and the first locking member can not retract into the inside of said circuit breaker housing because of the limitation of said switch-on button and/or said switch-off button.

7. The circuit breaker according to claim 6, wherein the circuit breaker further includes an unlocking mechanism drivingly connected to said first locking member; when the circuit breaker is in the switch-off state, operating said unlocking mechanism enables said first locking member to retract into the inside of said circuit breaker housing.

8. The circuit breaker according to claim 6, wherein after retracting into the inside of said circuit breaker housing said first locking member is co-operated with said switch-on button and/or said switch-off button in a position-limit way, such that said switch-on button and/or said switch-off button enables the circuit breaker not to switch on; said switch-on button and/or said switch-off button is provided with a button limiting groove co-operated with said first locking member in a position-limit way, and said first locking member includes a first locking member limiting protrusion fitted with said button limiting groove in a position-limit way; when the circuit breaker is in the switch-on state, said button limiting groove is misaligned with said first locking member limiting protrusion, and said switch-on button and/or said switch-off button prevents said first locking member from moving toward the inside of said circuit breaker housing; when the circuit breaker is in the switch-off state, said button limiting groove is arranged opposite to said first locking member limiting protrusion, so said first locking member can move toward the inside of said circuit breaker housing under an external force of retraction, enabling said first locking member limiting protrusion to slide into said button limiting groove and lock said switch-on button and/or said switch-off button.

9. The circuit breaker according to claim 6, wherein said switch-on button and said switch-off button are parallelly arranged and slidably and linearly installed inside said circuit breaker housing, said first locking member is movably and linearly installed inside a housing, and the movement directions of said switch-on button and said switch-off button are perpendicular to the movement direction of said first locking member; said locking mechanism further includes a first resetting spring arranged between said circuit breaker housing and said first locking member, and said first resetting spring applies a force on said first locking member, so as to enable one end of said first locking member to protrude outside said circuit breaker housing.

10. The circuit breaker according to claim 9, wherein said switch-on button and said first locking member are both positioned between said switch-off button and said locking member opening, and said first locking member is positioned at one side of said switch-on button; said switch-off button includes a button limiting groove co-operated with said first locking member in a position-limit way, said first locking member includes a first locking member limiting protrusion fitted with said button limiting groove, and said switch-on button is provided with a switch-on button avoiding groove used to avoid said first locking member limiting protrusion of said first locking member; when one end of said first locking member protrudes outside said circuit breaker housing, said first locking member limiting protrusion is positioned in said switch-on button avoiding groove, the width of which in the movement direction of said switch-on button is larger than the width of said first locking member limiting protrusion, enabling said switch-on button and said switch-off button to move and drive the circuit breaker to switch on and switch off; when the circuit breaker is in the switch-on state, said button limiting groove is misaligned with said first locking member limiting protrusion, and said first locking member limiting protrusion is positioned in said switch-on button avoiding groove, so that said switch-off button prevents said first locking member from moving toward the inside of said circuit breaker housing; when the circuit breaker is in the switch-off state, said button limiting groove is arranged opposite to said first locking member limiting protrusion, so that said first locking member can move toward the inside of said circuit breaker housing under an external force of retraction, enabling said first locking member limiting protrusion to slide into said button limiting groove.

11. The circuit breaker according to claim 1, wherein said circuit breaker further includes a locking mechanism co-operated with said button mechanism, said locking mechanism includes a second locking member pivotally arranged on said circuit breaker housing, and said second locking member includes a second locking end; pressing said switch-on button to actuate said operating mechanism enables the circuit breaker to switch on, and simultaneously enables said switch-off button to move toward the outside of said circuit breaker housing, and said switch-on button and/or said switch-off button actuate said second locking member to rotate, so that said second locking end protrudes outside said circuit breaker housing, and said second locking member is limited at a position by said switch-on button and/or said switch-off button and cannot retract into the inside of said circuit breaker housing; pressing said switch-off button to actuate said operating mechanism enables the circuit breaker to switch off, and simultaneously enables said switch-on button to move toward the outside of said circuit breaker housing, and said switch-on button and/or said switch-off button actuate said second locking member to rotate, so that said second locking end retracts inside said circuit breaker housing.

12. The circuit breaker according to claim 11, wherein said switch-on button includes a switch-on button driving part drivingly co-operated with said second locking member, and said switch-off button includes a switch-off button driving portion drivingly co-operated with said second locking member; when the circuit breaker switches on, said switch-off button driving said second locking member to rotate through said switch-off button driving portion enables said second locking end to protrude outside said circuit breaker housing, and said switch-off button driving portion withstanding said second locking end enables said second locking end not to retract into said circuit breaker housing; when the circuit breaker switches off, said switch-on button driving said second locking member to rotate through said switch-on button driving portion enables said second locking end to retract into said circuit breaker housing, and said switch-on button driving portion restricting said second locking end enables said second locking end to be kept inside said circuit breaker housing.

13. The circuit breaker according to claim 12, wherein said second locking member includes a second locking member mounting portion pivotally connected to said circuit breaker housing, a locking member's first activated portion drivingly co-operated with said switch-off button, a locking member's second activated portion drivingly co-operated with said switch-on button and a second locking end; when the circuit breaker switches on, said switch-off button driving said second locking member to rotate through said locking member's first activated portion enables said second locking end to protrude outside said circuit breaker housing; when the circuit breaker switches off, said switch-on button driving said second locking member to rotate through said locking member's second activated portion enables said second locking end to retract into said circuit breaker housing; said second locking member is stacked with said switch-on button and said switch-off button in a thickness direction of the circuit breaker.

14. The circuit breaker according to claim 13, wherein said locking member's first activated portion includes a locking member's first activated protrusion protruding toward one side of said switch-off button, and said locking member's second activated portion includes a locking member's second activated protrusion protruding toward one side of said switch-on button; said switch-on button driving portion includes a switch-on button driving bevel drivingly co-operated with said locking member's second activated protrusion, said switch-off button driving portion includes a switch-off button driving bevel drivingly co-operated with said locking member's first activated protrusion, the tilt direction of said switch-on button driving bevel is opposite to that of said switch-off button driving bevel, and said locking member's first activated protrusion and said locking member's second activated protrusion are positioned between said switch-off button driving bevel and said switch-on button driving bevel; when pressing said switch-on button enables the circuit breaker to switch on, said switch-on button driving bevel moves toward the inside of said circuit breaker housing along with said switch-on button to leave off said second locking member, meanwhile, said switch-off button driving bevel moves toward the outside of said circuit breaker housing along with said switch-off button, said switch-off button driving bevel driving said second locking member to rotate through said locking member's first activated protrusion enables said second locking end to protrude outside said circuit breaker housing, and said switch-off button driving bevel withstanding said locking member's first activated portion enables said second locking member not to retract into said circuit breaker housing; when pressing said switch-off button enables the circuit breaker to switch off, said switch-off button driving bevel moves toward the inside of said circuit breaker housing along with said switch-off button to leave off said second locking member, meanwhile, said switch-on button driving bevel moves toward the outside of said circuit breaker housing along with said switch-on button, said switch-on button driving bevel pressing said locking member's second activated protrusion enables said second locking end to retract into said circuit breaker housing, and said switch-on button driving bevel limiting said second locking member enables the latter to be kept inside said circuit breaker housing.

* * * * *